(12) United States Patent
Zhang

(10) Patent No.: US 11,580,552 B2
(45) Date of Patent: Feb. 14, 2023

(54) SYSTEM, METHOD, AND COMPUTER PROGRAM PRODUCT FOR DETERMINING AN EVENT IN A DISTRIBUTED DATA SYSTEM

(71) Applicant: Visa International Service Association, San Francisco, CA (US)

(72) Inventor: Jie Zhang, Palo Alto, CA (US)

(73) Assignee: Visa International Service Association, San Francisco, CA (US)

( * ) Notice: Subject to any disclaimer, the term of this patent is extended or adjusted under 35 U.S.C. 154(b) by 92 days.

(21) Appl. No.: 17/323,304

(22) Filed: May 18, 2021

(65) Prior Publication Data

US 2021/0272122 A1 Sep. 2, 2021

Related U.S. Application Data

(63) Continuation of application No. 15/978,934, filed on May 14, 2018, now Pat. No. 11,037,162.

(51) Int. Cl.
 *G06Q 20/00* (2012.01)
 *G06Q 20/40* (2012.01)

(52) U.S. Cl.
 CPC .............................. *G06Q 20/4016* (2013.01)

(58) Field of Classification Search
 USPC ......... 705/39, 38, 37, 40, 26, 27.1; 719/328, 719/315; 717/108; 709/226, 227;
 (Continued)

(56) References Cited

U.S. PATENT DOCUMENTS

| | | | |
|---|---|---|---|
| 9,092,447 B1 | 7/2015 | Anderson et al. | |
| 2003/0056092 A1* | 3/2003 | Edgett ................... | H04L 63/083 713/153 |

(Continued)

FOREIGN PATENT DOCUMENTS

WO 2019072312 A2 4/2019

OTHER PUBLICATIONS

Abnormal Payment Transaction Detection Scheme Based on Scalable Architecture and Redis Cluster; 2018 International Conference on Platform Technology and Service (PlatCon) (pp. 1-6); Taeyoung Lee; Yongsung Kim; Eenjun Hwang; Jan. 29, 2018. (Year: 2018).*

(Continued)

*Primary Examiner* — Tien C Nguyen
(74) *Attorney, Agent, or Firm* — The Webb Law Firm

(57) ABSTRACT

A method for preventing duplicate processing of a payment transaction includes: generating a first data structure with a first predetermined time interval and generating a second data structure with a second predetermined time interval. A first overlap region and second overlap region of the first and second predetermined time interval are defined by a same time interval. The method includes receiving first transaction data associated with a first payment transaction, receiving second transaction data associated with a second payment transaction, and determining based on a first transaction ID and a second transaction ID, that the second payment transaction is a duplicate of the first payment transaction. A computer program product and system for preventing duplicate processing of a payment transaction are also disclosed.

20 Claims, 17 Drawing Sheets

(58) Field of Classification Search
USPC ......... 715/704, 753, 708; 726/9, 6; 700/245; 235/375, 380
See application file for complete search history.

(56) References Cited

U.S. PATENT DOCUMENTS

| | | | | |
|---|---|---|---|---|
| 2005/0018668 | A1* | 1/2005 | Cheriton | H04L 47/10 370/389 |
| 2005/0055254 | A1* | 3/2005 | Schmidtberg | G06Q 10/0833 340/539.13 |
| 2007/0294183 | A1* | 12/2007 | Camenisch | H04L 9/3255 705/65 |
| 2012/0316992 | A1* | 12/2012 | Oborne | G06Q 20/386 705/26.41 |
| 2016/0086177 | A1* | 3/2016 | Billings | G06Q 40/12 705/40 |
| 2017/0178247 | A1* | 6/2017 | Farrell | G06Q 10/10 |
| 2019/0188290 | A1* | 6/2019 | Feulner | G06F 16/25 |

OTHER PUBLICATIONS

Evolution of Prepaid Payment Processor's Software Architecture: An Empirical Study; 2012 10th International Conference on Frontiers of Information Technology (pp. 188-195); Qureshi, A.H.; Malik, A.A; Dec. 17, 2012. (Year: 2012).*

Lomet et al., "Improving Transaction-Time DBMS Performance and Functionality", Mar. 1, 2009, 2009 IEEE 25th International Conference on Data Engineering, pp. 581-591.

Lomet et al., "Improving Transaction-Time DBMS Performance and Functionality", 2009 IEEE 25th International Conference on Data Engineering, 2009, pp. 581-591.

* cited by examiner

| PAN Number | Transaction ID | Timestamp |
|---|---|---|
| 1234567891010000 | 17128300 | December 31, 2017 @ 23:59:59 |
| 1234567891111005 | 18010000 | January 1, 2018 @ 01:01:57 |
| 1234567891216281 | 18010001 | January 1, 2018 @ 01:01:58 |
| 14862324661282 13 | 18010002 | January 1, 2018 @ 01:02:47 |
| ⋮ | ⋮ | ⋮ |

FIG. 6

1st Attempt

User Login

Username: Mark B. Smith

Password: DeskcHair!

Login Successful!

FIG. 13A

2nd Attempt

User Login

Username: Mark B. Smith

Password: DeskcHair!

Login Failed.

FIG. 13B

| PAN Number /146 | Temporary Offer ID /286 | Offer Description /288 | Time Stamp /290 |
|---|---|---|---|
| 1234567891010000 | 162532 | 10% off all Purchases | December 31, 2017 @ 23:57:15 |
| 1234567891111005 | 162533 | $5 off Purchase over $50 | January 1, 2018 @ 01:03:15 |
| 1234567891216281 | 162534 | 4% off Gasoline Purchases | January 1, 2018 @ 01:03:47 |
| 1486232466128213 | 162535 | 150 Bonus Airline Miles for any Purchase Today | January 1, 2018 @ 01:03:50 |
| ⋮ | ⋮ | ⋮ | ⋮ |

FIG. 15

SYSTEM, METHOD, AND COMPUTER PROGRAM PRODUCT FOR DETERMINING AN EVENT IN A DISTRIBUTED DATA SYSTEM

CROSS REFERENCE TO RELATED APPLICATION

The present application is a continuation application of U.S. patent application Ser. No. 15/978,934, filed on May 14, 2018, the entire content of which is hereby incorporated by reference.

BACKGROUND OF THE INVENTION

Field of the Invention

The invention relates to a system, method, and computer program product for determining an event in a distributed data system and, in one particular embodiment, to a system, method, and computer program product for preventing duplicate processing of a payment transaction.

Description of Related Art

A distributed database system may include a database in which storage devices are not all attached to a common processor. The database may be stored in multiple computers, located in the same physical location, or may be dispersed over a network of interconnected computers. Unlike a parallel systems, in which processors may be part of a single database system, a distributed database system may consist of sites that share no physical components. In some instances, a distributed database may reside on organized network servers or decentralized independent computers on the Internet, on corporate intranets or extranets, or on other organization networks.

An event may be an action or occurrence recognized by a computer system, which may originate asynchronously from an external environment, that may be handled by the computer system. Events may be generated or triggered by the computer system, by a user of the computer system, or in other ways. In some instances, events may be handled synchronously with a program flow by a computer system. For example, the computer system may have one or more dedicated places where events are handled (e.g., one or more dedicated event loops). In some instances, events may include requests from a computer system, for example, a request from a processor. Additionally, or alternatively, the computer system may store an event (e.g., a request) in a distributed database system.

Whether from a fraudulent source or a glitch in a computer system, a duplicate request may be submitted to a processor. A duplicate request is defined as a request identical to a previously submitted request to the computer system that was previously processed correctly to completion. A computer system receiving a duplicate request must determine whether a previously-submitted request associated with the duplicate request has been processed in order to determine that the request is a duplicate request. In many end-use cases, not identifying a request as a duplicate request and processing the duplicate request is undesirable and can have negative consequences to the computer system (because the previously-submitted request associated with the duplicate request has already been processed).

Several non-limiting examples of computer-implemented systems that would experience negative consequences from re-processing of duplicate requests include: processing of payment transactions, processing of tokenized transactions, processing of a temporary password, or processing of a temporary offer. However, other computer systems for processing data, including time-sensitive data, would also experience negative consequences from re-processing of a duplicate request.

To determine whether a request is a duplicate request, certain existing systems utilize a global data structure, such as a global database that includes all data in a single database, and determines whether the processing request is a duplicate processing request using a unique global index associated with each data entry stored therein. This method is inefficient because it can require querying the entire global database in search of an identical request that has already been processed. In addition, with ever increasing data volumes, it is oftentimes impractical to use a single global database because it is not possible to maintain such large datasets or sufficient hardware is cost prohibitive.

Other existing systems used to determine whether a request is a duplicate request and that do not use a global database may segment the data into separate, non-overlapping data structures based on a parameter, such as a time parameter. Such systems, however, run a risk of not identifying a request as a duplicate (leading to duplicate processing of identical requests) for data at the edges of the segmented data structure. Data at the edges of each separate data structure is particularly vulnerable to being misallocated, should the computing system malfunction for any period of time and store the data to a different data structure.

For example, a data entry expected to be near the end in a first segmented data structure based on a timestamp may instead be included as one of the early entries in the second segmented data structure including data immediately subsequent to data in the first segmented data structure. This may be for any number of reasons, such as the system malfunctioning at the time associated with data stored at the end of the first segmented data structure, causing the data entry to be stored once the system is functioning correctly again. Thus, existing systems including separate, non-overlapping data structures are especially at risk of not identifying a request as a duplicate request and, therefore, processing the duplicate request for data stored at the edges of each segmented data structure.

SUMMARY OF THE INVENTION

Accordingly, provided is an improved method, computer program product, and system for preventing duplicate processing of a payment transaction.

According to a non-limiting embodiment or aspect, provided is a method for preventing duplicate processing of a payment transaction including: generating, with at least one processor, a plurality of data structures, where generating the plurality of data structures includes: generating a first data structure associated with a first unique identifier, where the first data structure is associated with a first predetermined time interval, where the first predetermined time interval is defined by a first start time and a first end time, where the first data structure stores transaction data associated with a payment transaction that is initiated within the first predetermined time interval; and generating a second data structure associated with a second unique identifier, where the second data structure is associated with a second predetermined time interval, where the second predetermined time interval is defined by a second start time and a second end time, where the second data structure stores transaction data associated with a payment transaction that is initiated within the second predetermined time interval, where the second end time is after the first start time and before the first end time, and the second end time is after the first end time, where the first data structure includes a first overlap region and the second data structure includes a second overlap region, where the first overlap region and the second overlap region are defined by an overlap time interval, where the overlap time interval is defined between the second start time and the first end time; receiving, with at least one processor, first transaction data associated with a first payment transaction, where the first transaction data includes a first timestamp associated with initiation of the first payment transaction and a first transaction ID; determining, with at least one processor and based on the first timestamp, that the first payment transaction falls within the overlap time interval; upon determining that the first payment transaction falls within the overlap time interval storing, with at least one processor, the first transaction data to the first data structure and the second data structure; receiving, with at least one processor, second transaction data associated with a second payment transaction, where the second transaction data includes a second timestamp associated with initiation of the second payment transaction and a second transaction ID; determining, with at least one processor and based on the second timestamp, that the second payment transaction falls within the overlap time interval; and upon determining that the second payment transaction falls within the overlap time interval, determining, with at least one processor and based on the first transaction ID and the second transaction ID, that the second payment transaction is a duplicate of the first payment transaction.

In one non-limiting embodiment or aspect, the method may further include: upon determining that the second payment transaction is a duplicate of the first payment transaction, terminating, with at least one processor, processing of the second payment transaction. The method may further include: upon determining that the second payment transaction is a duplicate of the first payment transaction, generating and communicating, with at least one processor, a duplicate transaction response, where the duplicate transaction response includes data associated with identifying the second payment transaction as identical to the first payment transaction. The method may further include: upon determining that the second payment transaction is a duplicate of the first payment transaction, generating and communicating, with at least one processor, a duplicate transaction response, where the duplicate transaction response is identical to a response message communicated in connection with processing of the first payment transaction.

In one non-limiting embodiment or aspect, the first data structure and the second data structure may be stored on separate servers. Determining that the second payment transaction is a duplicate of the first payment transaction may include receiving a return value in response to a request to store the second transaction data. The method may further include: upon determining that the second payment transaction is a duplicate of the first payment transaction, initiating a fraudulent transaction submission protocol. The first predetermined time interval and/or the second predetermined time interval may include at least one month. The overlap time interval may include from one minute to one day. The first transaction data and/or second transaction data may be received in the form of a transaction processing request message.

According to a non-limiting embodiment or aspect, provided is a computer program product for preventing duplicate processing of a payment transaction including at least one non-transitory computer-readable medium including program instructions that, when executed by at least one computer including at least one processor, causes the at least one computer to: generate a plurality of data structures, where generating the plurality of data structures includes: generating a first data structure associated with a first unique identifier, where the first data structure is associated with a first predetermined time interval, where the first predetermined time interval is defined by a first start time and a first end time, where the first data structure stores transaction data associated with a payment transaction that is initiated within the first predetermined time interval; and generating a second data structure associated with a second unique identifier, where the second data structure is associated with a second predetermined time interval, where the second predetermined time interval is defined by a second start time and a second end time, where the second data structure stores transaction data associated with a payment transaction that is initiated within the second predetermined time interval, where the second end time is after the first start time and before the first end time, and the second end time is after the first end time, where the first data structure includes a first overlap region and the second data structure includes a second overlap region, where the first overlap region and the second overlap region are defined by an overlap time interval, where the overlap time interval is defined between the second start time and the first end time; receive first transaction data associated with a first payment transaction, where the first transaction data includes a first timestamp associated with initiation of the first payment transaction and a first transaction ID; determine based on the first timestamp, that the first payment transaction falls within the overlap time interval; upon determining that the first payment transaction falls within the overlap time interval store the first transaction data to the first data structure and the second data structure; receive second transaction data associated with a second payment transaction, where the second transaction data includes a second timestamp associated with initiation of the second payment transaction and a second transaction ID; determine based on the second timestamp, that the second payment transaction falls within the overlap time interval; and upon determining that the second payment transaction falls within the overlap time interval, determine based on the first transaction ID and the second transaction ID, that the second payment transaction is a duplicate of the first payment transaction.

In one non-limiting embodiment or aspect, the first data structure and the second data structure may be stored on separate servers.

According to a non-limiting embodiment or aspect, provided is a system for preventing duplicate processing of a payment transaction including at least one server computer including at least one processor, the at least one server computer programmed and/or configured to: generate a plurality of data structures, where generating the plurality of data structures includes: generating a first data structure associated with a first unique identifier, where the first data structure is associated with a first predetermined time interval, where the first predetermined time interval is defined by a first start time and a first end time, where the first data structure stores transaction data associated with a payment transaction that is initiated within the first predetermined time interval; and generating a second data structure associated with a second unique identifier, where the second data structure is associated with a second predetermined time interval, where the second predetermined time interval is defined by a second start time and a second end time, where the second data structure stores transaction data associated with a payment transaction that is initiated within the second predetermined time interval, where the second end time is after the first start time and before the first end time, and the second end time is after the first end time, where the first data structure includes a first overlap region and the second data structure includes a second overlap region, where the first overlap region and the second overlap region are defined by an overlap time interval, where the overlap time interval is defined between the second start time and the first end time; receive first transaction data associated with a first payment transaction, where the first transaction data includes a first timestamp associated with initiation of the first payment transaction and a first transaction ID; determine based on the first timestamp, that the first payment transaction falls within the overlap time interval; upon determining that the first payment transaction falls within the overlap time interval, store the first transaction data to the first data structure and the second data structure; receive second transaction data associated with a second payment transaction, where the second transaction data includes a second timestamp associated with initiation of the second payment transaction and a second transaction ID; determine based on the second timestamp, that the second payment transaction falls within the overlap time interval; and upon determining that the second payment transaction falls within the overlap time interval, determine based on the first transaction ID and the second transaction ID, that the second payment transaction is a duplicate of the first payment transaction.

In one non-limiting embodiment or aspect, the at least one server computer may be programmed and/or configured to: upon determining that the second payment transaction is a duplicate of the first payment transaction, terminate processing of the second payment transaction. The at least one server computer may be programmed and/or configured to: upon determining that the second payment transaction is a duplicate of the first payment transaction, generate and communicate a duplicate transaction response, where the duplicate transaction response includes data associated with identifying the second payment transaction as identical to the first payment transaction. The at least one server computer may be programmed and/or configured to: upon determining that the second payment transaction is a duplicate of the first payment transaction, generate and communicate a duplicate transaction response, where the duplicate transaction response is identical to a response message communicated in connection with processing of the first payment transaction.

In one non-limiting embodiment or aspect, the first data structure and the second data structure may be stored on separate servers. Determining that the second payment transaction is a duplicate of the first payment transaction may include receiving a return value in response to a request to store the second transaction data. The at least one server computer may be programmed and/or configured to: upon determining that the second payment transaction is a duplicate of the first payment transaction, initiate a fraudulent transaction submission protocol.

Further embodiments or aspects are set forth in the following numbered clauses:

Clause 1: A method for preventing duplicate processing of a payment transaction comprising: generating, with at least one processor, a plurality of data structures, wherein generating the plurality of data structures comprises: generating a first data structure associated with a first unique identifier, wherein the first data structure is associated with a first predetermined time interval, wherein the first predetermined time interval is defined by a first start time and a first end time, wherein the first data structure stores transaction data associated with a payment transaction that is initiated within the first predetermined time interval; and generating a second data structure associated with a second unique identifier, wherein the second data structure is associated with a second predetermined time interval, wherein the second predetermined time interval is defined by a second start time and a second end time, wherein the second data structure stores transaction data associated with a payment transaction that is initiated within the second predetermined time interval, wherein the second end time is after the first start time and before the first end time, and the second end time is after the first end time, wherein the first data structure comprises a first overlap region and the second data structure comprises a second overlap region, wherein the first overlap region and the second overlap region are defined by an overlap time interval, wherein the overlap time interval is defined between the second start time and the first end time; receiving, with at least one processor, first transaction data associated with a first payment transaction, wherein the first transaction data comprises a first timestamp associated with initiation of the first payment transaction and a first transaction ID; determining, with at least one processor and based on the first timestamp, that the first payment transaction falls within the overlap time interval; upon determining that the first payment transaction falls within the overlap time interval storing, with at least one processor, the first transaction data to the first data structure and the second data structure; receiving, with at least one processor, second transaction data associated with a second payment transaction, wherein the second transaction data comprises a second timestamp associated with initiation of the second payment transaction and a second transaction ID; determining, with at least one processor and based on the second timestamp, that the second payment transaction falls within the overlap time interval; and upon determining that the second payment transaction falls within the overlap time interval, determining, with at least one processor and based on the first transaction ID and the second transaction ID, that the second payment transaction is a duplicate of the first payment transaction.

Clause 2: The method of clause 1, further comprising: upon determining that the second payment transaction is a duplicate of the first payment transaction, terminating, with at least one processor, processing of the second payment transaction.

Clause 3: The method of clause 1 or 2, further comprising: upon determining that the second payment transaction is a duplicate of the first payment transaction, generating and communicating, with at least one processor, a duplicate transaction response, wherein the duplicate transaction response comprises data associated with identifying the second payment transaction as identical to the first payment transaction.

Clause 4: The method of any of the preceding clauses: upon determining that the second payment transaction is a duplicate of the first payment transaction, generating and communicating, with at least one processor, a duplicate transaction response, wherein the duplicate transaction response is identical to a response message communicated in connection with processing of the first payment transaction.

Clause 5: The method of any of the preceding clauses, wherein the first data structure and the second data structure are stored on separate servers.

Clause 6: The method of any of the preceding clauses, wherein determining that the second payment transaction is a duplicate of the first payment transaction comprises receiving a return value in response to a request to store the second transaction data.

Clause 7: The method of any of the preceding clauses, wherein upon determining that the second payment transaction is a duplicate of the first payment transaction, initiating a fraudulent transaction submission protocol.

Clause 8: The method of any of the preceding clauses, wherein the first predetermined time interval and/or the second predetermined time interval comprises at least one month.

Clause 9: The method of any of the preceding clauses, wherein the overlap time interval comprises from one minute to one day.

Clause 10: The method of any of the preceding clauses, wherein the first transaction data and/or second transaction data are received in the form of a transaction processing request message.

Clause 11: A computer program product for preventing duplicate processing of a payment transaction comprising at least one non-transitory computer-readable medium including program instructions that, when executed by at least one computer including at least one processor, causes the at least one computer to: generate a plurality of data structures, wherein generating the plurality of data structures comprises: generating a first data structure associated with a first unique identifier, wherein the first data structure is associated with a first predetermined time interval, wherein the first predetermined time interval is defined by a first start time and a first end time, wherein the first data structure stores transaction data associated with a payment transaction that is initiated within the first predetermined time interval; and generating a second data structure associated with a second unique identifier, wherein the second data structure is associated with a second predetermined time interval, wherein the second predetermined time interval is defined by a second start time and a second end time, wherein the second data structure stores transaction data associated with a payment transaction that is initiated within the second predetermined time interval, wherein the second end time is after the first start time and before the first end time, and the second end time is after the first end time, wherein the first data structure comprises a first overlap region and the second data structure comprises a second overlap region, wherein the first overlap region and the second overlap region are defined by an overlap time interval, wherein the overlap time interval is defined between the second start time and the first end time; receive first transaction data associated with a first payment transaction, wherein the first transaction data comprises a first timestamp associated with initiation of the first payment transaction and a first transaction ID; determine based on the first timestamp, that the first payment transaction falls within the overlap time interval; upon determining that the first payment transaction falls within the overlap time interval store the first transaction data to the first data structure and the second data structure; receive second transaction data associated with a second payment transaction, wherein the second transaction data comprises a second timestamp associated with initiation of the second payment transaction and a second transaction ID; determine based on the second timestamp, that the second payment transaction falls within the overlap time interval; and upon determining that the second payment transaction falls within the overlap time interval, determine based on the first transaction ID and the second transaction ID, that the second payment transaction is a duplicate of the first payment transaction.

Clause 12: The computer program product of clause 11, wherein the program instructions are further configured to cause the at least one computer to: upon determining that the second payment transaction is a duplicate of the first payment transaction, terminate, with at least one processor, processing of the second payment transaction.

Clause 13: The computer program product of clause 11 or 12, wherein the program instructions are further configured to cause the at least one computer to: upon determining that the second payment transaction is a duplicate of the first payment transaction, generate and communicate a duplicate transaction response, wherein the duplicate transaction response comprises data associated with identifying the second payment transaction as identical to the first payment transaction.

Clause 14: The computer program product of any of clauses 11-13, wherein the program instructions are further configured to cause the at least one computer to: upon determining that the second payment transaction is a duplicate of the first payment transaction, generate and communicate a duplicate transaction response, wherein the duplicate transaction response is identical to a response message communicated in connection with processing of the first payment transaction.

Clause 15: The computer program product of any of clauses 11-14, wherein the first data structure and the second data structure are stored on separate servers.

Clause 16: The computer program product of any of clauses 11-15, wherein determining that the second payment transaction is a duplicate of the first payment transaction comprises receiving a return value in response to a request to store the second transaction data.

Clause 17: The computer program product of any of clauses 11-16, wherein the program instructions are further configured to cause the at least one computer to: upon determining that the second payment transaction is a duplicate of the first payment transaction, initiate a fraudulent transaction submission protocol.

Clause 18: The computer program product of any of clauses 11-17, wherein the first predetermined time interval and/or the second predetermined time interval comprises at least one month.

Clause 19: The computer program product of any of clauses 11-18, wherein the overlap time interval comprises from one minute to one day.

Clause 20: The computer program product of any of clauses 11-19, wherein the first transaction data and/or second transaction data are received in the form of a transaction processing request message.

Clause 21: A system for preventing duplicate processing of a payment transaction comprising at least one server computer including at least one processor, the at least one server computer programmed and/or configured to: generate a plurality of data structures, wherein generating the plurality of data structures comprises: generating a first data structure associated with a first unique identifier, wherein the first data structure is associated with a first predetermined time interval, wherein the first predetermined time interval is defined by a first start time and a first end time, wherein the first data structure stores transaction data associated with a payment transaction that is initiated within the first predetermined time interval; and generating a second data structure associated with a second unique identifier, wherein the second data structure is associated with a second predetermined time interval, wherein the second predetermined time interval is defined by a second start time and a second end time, wherein the second data structure stores transaction data associated with a payment transaction that is initiated within the second predetermined time interval, wherein the second end time is after the first start time and before the first end time, and the second end time is after the first end time, wherein the first data structure comprises a first overlap region and the second data structure comprises a second overlap region, wherein the first overlap region and the second overlap region are defined by an overlap time interval, wherein the overlap time interval is defined between the second start time and the first end time; receive first transaction data associated with a first payment transaction, wherein the first transaction data comprises a first timestamp associated with initiation of the first payment transaction and a first transaction ID; determine based on the first timestamp, that the first payment transaction falls within the overlap time interval; upon determining that the first payment transaction falls within the overlap time interval store the first transaction data to the first data structure and the second data structure; receive second transaction data associated with a second payment transaction, wherein the second transaction data comprises a second timestamp associated with initiation of the second payment transaction and a second transaction ID; determine based on the second timestamp, that the second payment transaction falls within the overlap time interval; and upon determining that the second payment transaction falls within the overlap time interval, determine based on the first transaction ID and the second transaction ID, that the second payment transaction is a duplicate of the first payment transaction.

Clause 22: The system of clause 21, wherein the at least one server computer is programmed and/or configured to: upon determining that the second payment transaction is a duplicate of the first payment transaction, terminate processing of the second payment transaction.

Clause 23: The system of clause 21 or 22, wherein the at least one server computer is programmed and/or configured to: upon determining that the second payment transaction is a duplicate of the first payment transaction, generate and communicate a duplicate transaction response, wherein the duplicate transaction response comprises data associated with identifying the second payment transaction as identical to the first payment transaction.

Clause 24: The system of any of clauses 21-23, wherein the at least one server computer is programmed and/or configured to: upon determining that the second payment transaction is a duplicate of the first payment transaction, generate and communicate a duplicate transaction response, wherein the duplicate transaction response is identical to a response message communicated in connection with processing of the first payment transaction.

Clause 25: The system of any of clauses 21-24, wherein the first data structure and the second data structure are stored on separate servers.

Clause 26: The system of any of clauses 21-25, wherein determining that the second payment transaction is a duplicate of the first payment transaction comprises receiving a return value in response to a request to store the second transaction data.

Clause 27: The system of any of clauses 21-26, wherein the at least one server computer is programmed and/or configured to: upon determining that the second payment transaction is a duplicate of the first payment transaction, initiate a fraudulent transaction submission protocol.

Clause 28: The system of any of clauses 21-27, wherein the first predetermined time interval and/or the second predetermined time interval comprises at least one month.

Clause 29: The system of any of clauses 21-28, wherein the overlap time interval comprises from one minute to one day.

Clause 30: The system of any of clauses 21-29, wherein the first transaction data and/or second transaction data are received in the form of a transaction processing request message.

Clause 31: A method for preventing duplication of data processing comprising: generating, with at least one processor, a plurality of data structures, wherein generating the plurality of data structures comprises: generating a first data structure associated with a first unique identifier, wherein the first data structure is associated with a first predetermined time interval, wherein the first predetermined time interval is defined by a first start time and a first end time, wherein the first data structure stores data associated with the first predetermined time interval; and generating a second data structure associated with a second unique identifier, wherein the second data structure is associated with a second predetermined time interval, wherein the second predetermined time interval is defined by a second start time and a second end time, wherein the second data structure stores data associated with the second predetermined time interval, wherein the second end time is after the first start time and before the first end time, and the second end time is after the first end time, wherein the first data structure comprises a first overlap region and the second data structure comprises a second overlap region, wherein the first overlap region and the second overlap region are defined by an overlap time interval, wherein the overlap time interval is defined between the second start time and the first end time; receiving, with at least one processor, first data comprising a first timestamp and a first data ID; determining, with at least one processor and based on the first timestamp, that the first data falls within the overlap time interval; upon determining that the first data falls within the overlap time interval storing, with at least one processor, the first data to the first data structure and the second data structure; receiving, with at least one processor, second data comprising a second timestamp and a second data ID; determining, with at least one processor and based on the second timestamp, that the second data falls within the overlap time interval; and upon determining that the second data falls within the overlap time interval, determining, with at least one processor and based on the first data ID and the second data ID, that the second data is a duplicate of the first data.

Clause 32: The method of clause 31, further comprising: upon determining that the second data is a duplicate of the first data, terminating, with at least one processor, processing of the second data.

Clause 33: The method of clause 31 or 32, further comprising: upon determining that the second data is a duplicate of the first data, generating and communicating, with at least one processor, a duplicate data response, wherein the duplicate data response comprises data associated with identifying the second data as identical to the first data.

Clause 34: The method of any of clauses 31-33, further comprising: upon determining that the second data is a duplicate of the first data, generating and communicating, with at least one processor, a duplicate response, wherein the duplicate response is identical to a response message communicated in connection with processing of the first data.

Clause 35: The method of any of clauses 31-34, wherein the first data structure and the second data structure are stored on separate servers.

Clause 36: The method of any of clauses 31-35, wherein determining that the second data is a duplicate of the first data comprises receiving a return value in response to a request to store the second data.

Clause 37: A computer program product for preventing duplication of data processing comprising at least one non-transitory computer-readable medium including program instructions that, when executed by at least one computer including at least one processor, causes the at least one computer to: generate a plurality of data structures, wherein generating the plurality of data structures comprises: generating a first data structure associated with a first unique identifier, wherein the first data structure is associated with a first predetermined time interval, wherein the first predetermined time interval is defined by a first start time and a first end time, wherein the first data structure stores data associated with the first predetermined time interval; and generating a second data structure associated with a second unique identifier, wherein the second data structure is associated with a second predetermined time interval, wherein the second predetermined time interval is defined by a second start time and a second end time, wherein the second data structure stores data associated with the second predetermined time interval, wherein the second end time is after the first start time and before the first end time, and the second end time is after the first end time, wherein the first data structure comprises a first overlap region and the second data structure comprises a second overlap region, wherein the first overlap region and the second overlap region are defined by an overlap time interval, wherein the overlap time interval is defined between the second start time and the first end time; receive first data comprising a first timestamp and a first data ID; determine based on the first timestamp, that the first data falls within the overlap time interval; upon determining that the first data falls within the overlap time interval store the first data to the first data structure and the second data structure; receive second data comprising a second timestamp and a second data ID; determine based on the second timestamp, that the second data falls within the overlap time interval; and upon determining that the second data falls within the overlap time interval, determine based on the first data ID and the second data ID, that the second data is a duplicate of the first data.

Clause 38: The computer program product of clause 37, wherein the program instructions are further configured to cause the at least one computer to: upon determining that the second data is a duplicate of the first data, terminate processing of the second data.

Clause 39: The computer program product of clause 37 or 38, wherein the program instructions are further configured to cause the at least one computer to: upon determining that the second data is a duplicate of the first data, generate and communicate a duplicate data response, wherein the duplicate data response comprises data associated with identifying the second data as identical to the first data.

Clause 40: The computer program product of any of clauses 37-39, wherein the program instructions are further configured to cause the at least one computer to: upon determining that the second data is a duplicate of the first data, generate and communicate, with at least one processor, a duplicate response, wherein the duplicate response is identical to a response message communicated in connection with processing of the first data.

Clause 41: The computer program product of any of clauses 37-40, wherein the first data structure and the second data structure are stored on separate servers.

Clause 42: The computer program product of any of clauses 37-41, determining that the second data is a duplicate of the first data comprises receiving a return value in response to a request to store the second data.

Clause 43: A system for preventing duplication of data processing comprising at least one server computer including at least one processor, the at least one server computer programmed and/or configured to: generate a plurality of data structures, wherein generating the plurality of data structures comprises: generating a first data structure associated with a first unique identifier, wherein the first data structure is associated with a first predetermined time interval, wherein the first predetermined time interval is defined by a first start time and a first end time, wherein the first data structure stores data associated with the first predetermined time interval; and generating a second data structure associated with a second unique identifier, wherein the second data structure is associated with a second predetermined time interval, wherein the second predetermined time interval is defined by a second start time and a second end time, wherein the second data structure stores data associated with the second predetermined time interval, wherein the second end time is after the first start time and before the first end time, and the second end time is after the first end time, wherein the first data structure comprises a first overlap region and the second data structure comprises a second overlap region, wherein the first overlap region and the second overlap region are defined by an overlap time interval, wherein the overlap time interval is defined between the second start time and the first end time; receive first data comprising a first timestamp and a first data ID; determine based on the first timestamp, that the first data falls within the overlap time interval; upon determining that the first data falls within the overlap time interval store the first data to the first data structure and the second data structure; receive second data comprising a second timestamp and a second data ID; determine based on the second timestamp, that the second data falls within the overlap time interval; and upon determining that the second data falls within the overlap time interval, determine based on the first data ID and the second data ID, that the second data is a duplicate of the first data.

Clause 44: The system of clause 43, wherein the at least one server computer is programmed and/or configured to: upon determining that the second data is a duplicate of the first data, terminate processing of the second data.

Clause 45: The system of clause 43 or 44, wherein the at least one server computer is programmed and/or configured to: upon determining that the second data is a duplicate of the first data, generate and communicate a duplicate data response, wherein the duplicate data response comprises data associated with identifying the second data as identical to the first data.

Clause 46: The system of any of clauses 43-45, wherein the at least one server computer is programmed and/or configured to: upon determining that the second data is a duplicate of the first data, generate and communicate, with at least one processor, a duplicate response, wherein the duplicate response is identical to a response message communicated in connection with processing of the first data.

Clause 47: The system of any of clauses 43-46, wherein the first data structure and the second data structure are stored on separate servers.

Clause 48: The system of any of clauses 43-47, wherein determining that the second data is a duplicate of the first data comprises receiving a return value in response to a request to store the second data.

Clause 49: A method for preventing duplicate processing of a token assigned for temporary use comprising: generating, with at least one processor, a plurality of data structures, wherein generating the plurality of data structures comprises: generating a first data structure associated with a first unique identifier, wherein the first data structure is associated with a first predetermined time interval, wherein the first predetermined time interval is defined by a first start time and a first end time, wherein the first data structure stores token data associated with a temporary token generated within the first predetermined time interval; and generating a second data structure associated with a second unique identifier, wherein the second data structure is associated with a second predetermined time interval, wherein the second predetermined time interval is defined by a second start time and a second end time, wherein the second data structure stores token data associated with a temporary token generated within the second predetermined time interval, wherein the second end time is after the first start time and before the first end time, and the second end time is after the first end time, wherein the first data structure comprises a first overlap region and the second data structure comprises a second overlap region, wherein the first overlap region and the second overlap region are defined by an overlap time interval, wherein the overlap time interval is defined between the second start time and the first end time; receiving, with at least one processor, first token data associated with a first token, wherein the first token data comprises a first timestamp associated with generation of the first token and a first token ID; determining, with at least one processor and based on the first timestamp, that the first timestamp falls within the overlap time interval; upon determining that the first timestamp falls within the overlap time interval storing, with at least one processor, the first token data to the first data structure and the second data structure; receiving, with at least one processor, second token data associated with a second token, wherein the second token comprises a second timestamp associated with generation of the second token and a second token ID; determining, with at least one processor and based on the second timestamp, that the second timestamp falls within the overlap time interval; and upon determining that the second timestamp falls within the overlap time interval, determining, with at least one processor and based on the first token ID and the second token ID, that the second token is a duplicate of the first token.

Clause 50: The method of clause 49, further comprising: determining whether the first token and/or the second token are expired.

Clause 51: The method of clause 49 or 50, further comprising: upon determining that the second token is a duplicate of the first token, terminating, with at least one processor, processing of the second token.

Clause 52: The method of any of clauses 49-51, further comprising: upon determining that the second token is a duplicate of the first token, generating and communicating, with at least one processor, a duplicate token response, wherein the duplicate token response comprises data associated with identifying the second token as identical to the first token.

Clause 53: The method of any of clauses 49-52, further comprising: upon determining that the second token is a duplicate of the first token, generating and communicating, with at least one processor, a duplicate token response, wherein the duplicate token response is identical to a response message communicated in connection with processing of the first token.

Clause 54: The method of any of clauses 49-53, wherein the first data structure and the second data structure are stored on separate servers.

Clause 55: The method of any of clauses 49-54, wherein determining that the second token is a duplicate of the first token comprises receiving a return value in response to a request to store the second token data.

Clause 56: The method of any of clauses 49-55, wherein upon determining that the second token is a duplicate of the first token, initiating a fraudulent token submission protocol.

Clause 57: The method of any of clauses 49-56, wherein the first predetermined time interval and/or the second predetermined time interval comprises at least one month.

Clause 58: The method of any of clauses 49-57, wherein the overlap time interval comprises from one minute to one day.

Clause 59: The method of any of clauses 49-58, wherein the first token data and/or second token data are received in the form of a token processing request message.

Clause 60: A system for preventing duplicate processing of a token assigned for temporary use comprising at least one server computer including at least one processor, the at least one server computer programmed and/or configured to: generate a plurality of data structures, wherein generating the plurality of data structures comprises: generating a first data structure associated with a first unique identifier, wherein the first data structure is associated with a first predetermined time interval, wherein the first predetermined time interval is defined by a first start time and a first end time, wherein the first data structure stores token data associated with a temporary token generated within the first predetermined time interval; and generating a second data structure associated with a second unique identifier, wherein the second data structure is associated with a second predetermined time interval, wherein the second predetermined time interval is defined by a second start time and a second end time, wherein the second data structure stores token data associated with a temporary token generated within the second predetermined time interval, wherein the second end time is after the first start time and before the first end time, and the second end time is after the first end time, wherein the first data structure comprises a first overlap region and the second data structure comprises a second overlap region, wherein the first overlap region and the second overlap region are defined by an overlap time interval, wherein the overlap time interval is defined between the second start time and the first end time; receive first token data associated with a first token, wherein the first token data comprises a first timestamp associated with generation of the first token and a first token ID; determine based on the first timestamp, that the first timestamp falls within the overlap time interval; upon determining that the first timestamp falls within the overlap time interval, store the first token data to the first data structure and the second data structure; receive second token data associated with a second token, wherein the second token comprises a second timestamp associated with generation of the second token and a second token ID; determine based on the second timestamp, that the second timestamp falls within the overlap time interval; and upon determining that the second timestamp falls within the overlap time interval, determine based on the first token ID and the second token ID, that the second token is a duplicate of the first token.

Clause 61: A method for preventing duplicate processing of a password assigned for temporary use comprising: generating, with at least one processor, a plurality of data structures, wherein generating the plurality of data structures comprises: generating a first data structure associated with a first unique identifier, wherein the first data structure is associated with a first predetermined time interval, wherein the first predetermined time interval is defined by a first start time and a first end time, wherein the first data structure stores password data associated with a temporary password generated within the first predetermined time interval; and generating a second data structure associated with a second unique identifier, wherein the second data structure is associated with a second predetermined time interval, wherein the second predetermined time interval is defined by a second start time and a second end time, wherein the second data structure stores password data associated with a temporary password generated within the second predetermined time interval, wherein the second end time is after the first start time and before the first end time, and the second end time is after the first end time, wherein the first data structure comprises a first overlap region and the second data structure comprises a second overlap region, wherein the first overlap region and the second overlap region are defined by an overlap time interval, wherein the overlap time interval is defined between the second start time and the first end time; receiving, with at least one processor, first password data associated with a first password, wherein the first password data comprises a first timestamp associated with generation of the first password; determining, with at least one processor and based on the first timestamp, that the first timestamp falls within the overlap time interval; upon determining that the first timestamp falls within the overlap time interval storing, with at least one processor, the first password data to the first data structure and the second data structure; receiving, with at least one processor, second password data associated with a second password, wherein the second password comprises a second timestamp associated with generation of the second password; determining, with at least one processor and based on the second timestamp, that the second timestamp falls within the overlap time interval; and upon determining that the second timestamp falls within the overlap time interval, determining, with at least one processor and based on the first password and the second password, that the second password is a duplicate of the first password.

Clause 62: The method of clause 61, further comprising: determining whether the first password and/or the second password are expired.

Clause 63: The method of clause 61 or 62, further comprising: upon determining that the second password is a duplicate of the first password, terminating, with at least one processor, processing of the second password.

Clause 64: The method of any of clauses 61-63, further comprising: upon determining that the second password is a duplicate of the first password, generating and communicating, with at least one processor, a duplicate password response, wherein the duplicate password response comprises data associated with identifying the second password as identical to the first password.

Clause 65: The method of any of clauses 61-64, further comprising: upon determining that the second password is a duplicate of the first password, generating and communicating, with at least one processor, a duplicate password response, wherein the duplicate password response is identical to a response message communicated in connection with processing of the first password.

Clause 66: The method of any of clauses 61-65, wherein the first data structure and the second data structure are stored on separate servers.

Clause 67: The method of any of clauses 61-66, wherein determining that the second password is a duplicate of the first password comprises receiving a return value in response to a request to store the second password data.

Clause 68: The method of any of clauses 61-67, wherein upon determining that the second password is a duplicate of the first password, initiating a fraudulent password submission protocol.

Clause 69: The method of any of clauses 61-68, wherein the first predetermined time interval and/or the second predetermined time interval comprises at least one month.

Clause 70: The method of any of clauses 61-69, wherein the overlap time interval comprises from one minute to one day.

Clause 71: The method of any of clauses 61-70, wherein the first password data and/or second password data are received in the form of a password processing request message.

Clause 72: A system for preventing duplicate processing of a password assigned for temporary use comprising at least one server computer including at least one processor, the at least one server computer programmed and/or configured to: generate a plurality of data structures, wherein generating the plurality of data structures comprises: generating a first data structure associated with a first unique identifier, wherein the first data structure is associated with a first predetermined time interval, wherein the first predetermined time interval is defined by a first start time and a first end time, wherein the first data structure stores password data associated with a temporary password generated within the first predetermined time interval; and generating a second data structure associated with a second unique identifier, wherein the second data structure is associated with a second predetermined time interval, wherein the second predetermined time interval is defined by a second start time and a second end time, wherein the second data structure stores password data associated with a temporary password generated within the second predetermined time interval, wherein the second end time is after the first start time and before the first end time, and the second end time is after the first end time, wherein the first data structure comprises a first overlap region and the second data structure comprises a second overlap region, wherein the first overlap region and the second overlap region are defined by an overlap time interval, wherein the overlap time interval is defined between the second start time and the first end time; receive first password data associated with a first password, wherein the first password data comprises a first timestamp associated with generation of the first password; determine based on the first timestamp, that the first timestamp falls within the overlap time interval; upon determining that the first timestamp falls within the overlap time interval, store the first password data to the first data structure and the second data structure; receive second password data associated with a second password, wherein the second password comprises a second timestamp associated with generation of the second password; determine based on the second timestamp, that the second timestamp falls within the overlap time interval; and upon determining that the second timestamp falls within the overlap time interval, determine based on the first password and the second password, that the second password is a duplicate of the first password.

Clause 73: A method for preventing duplicate processing of an offer issued for temporary redemption comprising:

generating, with at least one processor, a plurality of data structures, wherein generating the plurality of data structures comprises: generating a first data structure associated with a first unique identifier, wherein the first data structure is associated with a first predetermined time interval, wherein the first predetermined time interval is defined by a first start time and a first end time, wherein the first data structure stores offer data associated with a temporary offer issued within the first predetermined time interval; and generating a second data structure associated with a second unique identifier, wherein the second data structure is associated with a second predetermined time interval, wherein the second predetermined time interval is defined by a second start time and a second end time, wherein the second data structure stores offer data associated with a temporary offer issued within the second predetermined time interval, wherein the second end time is after the first start time and before the first end time, and the second end time is after the first end time, wherein the first data structure comprises a first overlap region and the second data structure comprises a second overlap region, wherein the first overlap region and the second overlap region are defined by an overlap time interval, wherein the overlap time interval is defined between the second start time and the first end time; receiving, with at least one processor, first offer data associated with a first offer, wherein the first offer data comprises a first timestamp associated with issuance of the first offer and a first offer ID; determining, with at least one processor and based on the first timestamp, that the first timestamp falls within the overlap time interval; upon determining that the first timestamp falls within the overlap time interval storing, with at least one processor, the first offer data to the first data structure and the second data structure; receiving, with at least one processor, second offer data associated with a second offer, wherein the second offer comprises a second timestamp associated with issuance of the second offer and a second offer ID; determining, with at least one processor and based on the second timestamp, that the second timestamp falls within the overlap time interval; and upon determining that the second timestamp falls within the overlap time interval, determining, with at least one processor and based on the first offer ID and the second offer ID, that the second offer is a duplicate of the first offer.

Clause 74: The method of clause 73, further comprising: determining whether the first offer and/or the second offer are expired.

Clause 75: The method of clause 73 or 74, further comprising: upon determining that the second offer is a duplicate of the first offer, terminating, with at least one processor, processing of the second offer.

Clause 76: The method of any of clauses 73-75, further comprising: upon determining that the second offer is a duplicate of the first offer, generating and communicating, with at least one processor, a duplicate offer response, wherein the duplicate offer response comprises data associated with identifying the second offer as identical to the first offer.

Clause 77: The method of any of clauses 73-76, further comprising: upon determining that the second offer is a duplicate of the first offer, generating and communicating, with at least one processor, a duplicate offer response, wherein the duplicate offer response is identical to a response message communicated in connection with processing of the first offer.

Clause 78: The method of any of clauses 73-77, wherein the first data structure and the second data structure are stored on separate servers.

Clause 79: The method of any of clauses 73-78, wherein determining that the second offer is a duplicate of the first offer comprises receiving a return value in response to a request to store the second offer.

Clause 80: The method of any of clauses 73-79, wherein upon determining that the second offer is a duplicate of the first offer, initiating a fraudulent offer redemption protocol.

Clause 81: The method of any of clauses 73-80, wherein the first predetermined time interval and/or the second predetermined time interval comprises at least one month.

Clause 82: The method of any of clauses 73-81, wherein the overlap time interval comprises from one minute to one day.

Clause 83: The method of any of clauses 73-82, wherein the first offer data and/or second offer data are received in the form of an offer processing request message.

Clause 84: A system for preventing duplicate processing of an offer issued for temporary redemption comprising at least one server computer including at least one processor, the at least one server computer programmed and/or configured to: generate a plurality of data structures, wherein generating the plurality of data structures comprises: generating a first data structure associated with a first unique identifier, wherein the first data structure is associated with a first predetermined time interval, wherein the first predetermined time interval is defined by a first start time and a first end time, wherein the first data structure stores offer data associated with a temporary offer generated within the first predetermined time interval; and generating a second data structure associated with a second unique identifier, wherein the second data structure is associated with a second predetermined time interval, wherein the second predetermined time interval is defined by a second start time and a second end time, wherein the second data structure stores offer data associated with a temporary offer issued within the second predetermined time interval, wherein the second end time is after the first start time and before the first end time, and the second end time is after the first end time, wherein the first data structure comprises a first overlap region and the second data structure comprises a second overlap region, wherein the first overlap region and the second overlap region are defined by an overlap time interval, wherein the overlap time interval is defined between the second start time and the first end time; receive first offer data associated with a first offer, wherein the first offer data comprises a first timestamp associated with issuance of the first offer and a first offer ID; determine based on the first timestamp, that the first timestamp falls within the overlap time interval; upon determining that the first timestamp falls within the overlap time interval, store the first offer data to the first data structure and the second data structure; receive second offer data associated with a second offer, wherein the second offer comprises a second timestamp associated with generation of the second offer and a second offer ID; determine based on the second timestamp, that the second timestamp falls within the overlap time interval; and upon determining that the second timestamp falls within the overlap time interval, determine based on the first offer ID and the second offer ID, that the second offer is a duplicate of the first offer.

BRIEF DESCRIPTION OF THE DRAWINGS

Additional advantages and details of the invention are explained in greater detail below with reference to the exemplary embodiments that are illustrated in the accompanying schematic figures, in which:

FIG. 6 shows a data structure for data associated with a payment transaction according to the present invention;

FIG. 13A shows a schematic diagram of a login screen for processing of a password assigned for temporary use, the system processing a first request for processing the password according to the present invention;

FIG. 13B shows a schematic diagram of a login screen for preventing duplicate processing of a password assigned for temporary use, the system processing a second duplicate request for processing the password according to the present invention;

FIG. 15 shows a data structure for data associated with an offer issued for temporary use according to the present invention;

DESCRIPTION OF THE INVENTION

Figure 1:
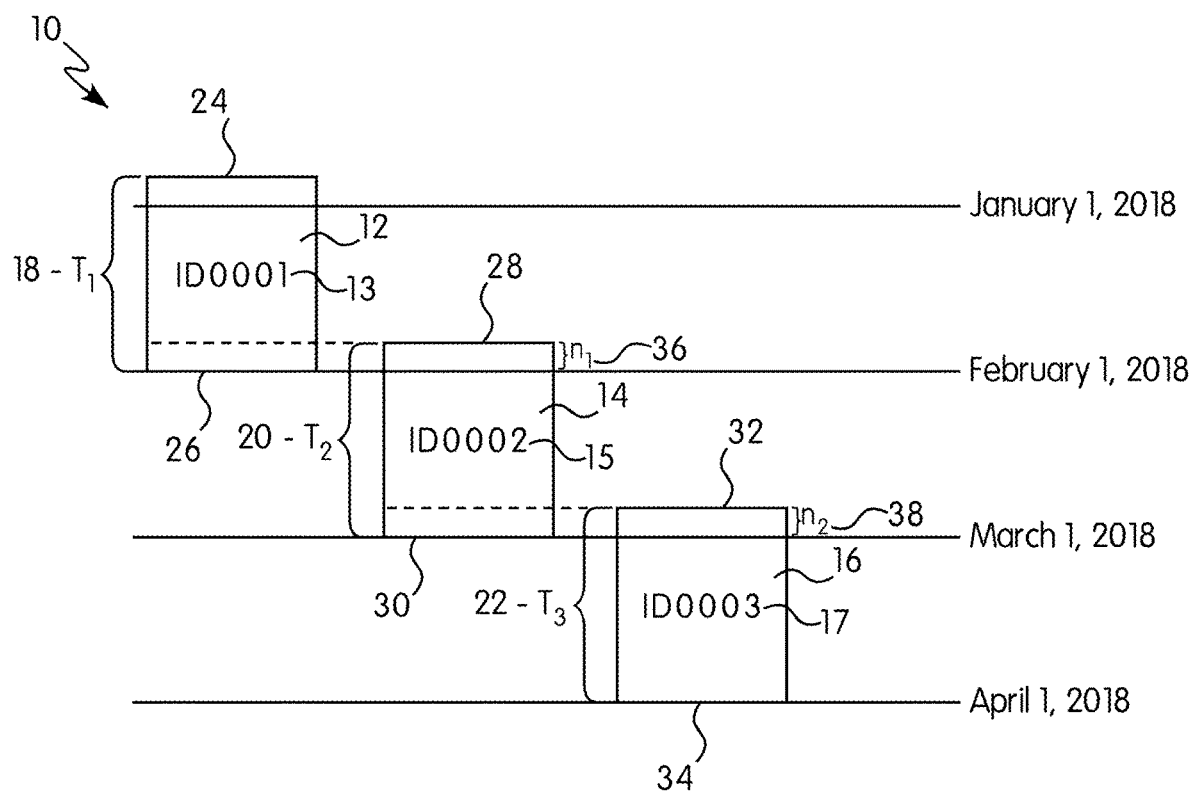
FIG. 1 shows a schematic diagram of a plurality of data structures according to the present invention.

For purposes of the description hereinafter, the terms "end," "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

As used herein, the terms "communication" and "communicate" may refer to the reception, receipt, transmission, transfer, provision, and/or the like, of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet, and/or the like) that includes data. It will be appreciated that numerous other arrangements are possible.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing server" may refer to one or more computer systems operated by or on behalf of a transaction service provider, such as a transaction processing server executing one or more software applications. A transaction processing server may include one or more processors and, in some non-limiting embodiments, may be operated by or on behalf of a transaction service provider.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a portable financial device, such as a physical financial instrument, e.g., a payment card, and/or may be electronic and used for electronic payments. The term "issuer system" or "issuer server" refers to one or more computer systems operated by or on behalf of an issuer institution, such as a server computer executing one or more software applications. For example, an issuer system may include one or more authorization servers for authorizing a transaction.

As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases, and/or the like) that may be used to conduct a transaction without directly using the original account identifier. In some examples, an original account identifier, such as a PAN, may be associated with a plurality of tokens for different individuals or purposes.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The term "client device," as used herein, refers to any electronic device that is configured to communicate with one or more servers or remote devices and/or systems. A client device may include a mobile device, a network-enabled appliance (e.g., a network-enabled television, refrigerator, thermostat, and/or the like), a computer, a POS system, and/or any other device or system capable of communicating with a network.

As used herein, the term "computing device" may refer to one or more electronic devices that are configured to directly or indirectly communicate with or over one or more networks. The computing device may be a mobile device. In other non-limiting embodiments, the computing device may be a desktop computer or other non-mobile computer. Furthermore, the term "computer" may refer to any computing device that includes the necessary components to receive, process, and output data, and normally includes a display, a processor, a memory, an input device, and a network interface. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, etc.).

As used herein, the term "portable financial device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments, the portable financial device may include volatile or non-volatile memory to store information (e.g., an account identifier, a name of the account holder, and/or the like).

The term "account data," as used herein, refers to any data concerning one or more accounts for one or more users. Account data may include, for example, one or more account identifiers, user identifiers, transaction histories, balances, credit limits, issuer institution identifiers, and/or the like.

As used herein, the term "server" may refer to or include one or more processors or computers, storage devices, or similar computer arrangements that are operated by or facilitate communication and processing for multiple parties in a network environment, such as the internet, although it will be appreciated that communication may be facilitated over one or more public or private network environments and that various other arrangements are possible. Further, multiple computers, e.g., servers, or other computerized devices, e.g., point-of-sale devices, directly or indirectly communicating in the network environment may constitute a "system," such as a merchant's point-of-sale system. Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Non-limiting embodiments or aspects of the present invention are directed to a method, system and computer program product for preventing duplication of data processing. Non-limiting embodiments or aspects of the invention include a plurality of data structures for storing data, with temporally consecutive data structures including at least one overlap time interval defined between the start time of the second data structure and the end time of the first data structure. The overlap time interval accounts for the potential for data that was intended to be associated with a first time being instead associated with a second time because, for instance, a system malfunction during the first time prevented the data from being associated with the first time.

In this way, the overlap time interval allows for data at the edge of a data structure (e.g., data at the edge of a data structure that includes data associated with an event, data at the edge of a data structure that includes data associated with a request, and/or the like) to still be captured within the overlap time interval of that data structure. By capturing data at the edge of a data structure within the overlap time interval, a computer system can prevent the failure to identify a request as a duplicate request to process the same data and prevent duplicate processing of the data.

In addition, segmenting of the data as in the present invention increases efficiency of the computer system and reduces processing time to determine whether there is potentially duplicate data. Embodiments of the present invention also save hardware costs for the computer system as data structures having less storage capacity may not be as costly as data structures having large storage capacity to function as a global data structure for storing all data. Embodiments of the present invention also provide a solution for systems in which large quantities of data are generated and stored that may exceed the potential storage capacity of any single global data structure. Therefore, embodiments of the present invention increases the efficiency of the computer system and ensures that duplicate requests to process data are recognized so that resources of the computer system are not used to re-process the data.

Referring to FIG. 1, a non-limiting embodiment or aspect of a system 10 including a plurality of data structures is shown according to the present invention. The system may include a first data structure 12 having a first unique identifier 13, a second data structure 14 having a second unique identifier 15, a third data structure 16 have a third unique identifier 17, and so forth, such that the system 10 includes n data structures, each data structure having a unique identifier. The unique identifier of each data structure allows each data structure to be identified using only that unique identifier. The unique identifier of each data structure is different from the unique identifier associated with any other data structure in the system 10. The system 10 includes at least two data structures (the first data structure 12 and the second data structure 14). The data structures may be storage devices, such as databases, configured to store electronic data. Data may include any information capable of being stored and transmitted. The data may be associated with any number of activities, including, but not limited to, payment transactions, tokens issued for temporary use in connection with a payment transaction, a password issued for temporary use in connection with a user account, an offer issued for temporary use redeemable with a payment transaction, and the like.

With continued reference to FIG. 1, the system may define a first predetermined time interval ($T_1$) 18, a second predetermined time interval ($T_2$) 20, and a third predetermined time interval ($T_3$) 22. $T_1$-$T_3$ may be temporally consecutive such that there is no time gap between $T_1$ and $T_2$ and between $T_2$ and $T_3$. The first data structure 12 (and $T_1$) may be defined between a first start time 24 and a first end time 26, such that the first data structure 12 may store data associated with a time between the first start time 24 and the first end time 26. The second data structure 14 (and $T_2$) may be defined between a second start time 28 and a second end time 30, such that the second data structure 14 may store data associated with a time between the second start time 28 and the second end time 30. The third data structure 16 (and $T_3$) may be defined between a third start time 32 and a third end time 34, such that the third data structure 16 may store data associated with a time between the third start time 32 and the third end time 34.

With continued reference to FIG. 1, the second start time 28 may be after the first start time 24 but before the first end time 26. In this way, an overlap region is created in the first data structure 12 and the second data structure 14, which is defined as an overlap region ($n_1$) 36 (an overlap time interval). Data associated with a time in this overlap region 36 may be stored in both the first data structure 12 and the second data structure 14. Similarly, the third start time 32 may be after the second start time 28 but before the second end time 30. In this way, an overlap region is created in the second data structure 14 and the third data structure 16, which is defined as an overlap region ($n_2$) 38. Data associated with a time in this overlap region 38 may be stored in both the second data structure 14 and the third data structure 16. The overlap regions 36, 38 may be defined proximate the "edge" of at least one of the data structures, such that the edge region includes the first and/or the last data entries stored in one of the data structures.

Figure 2:
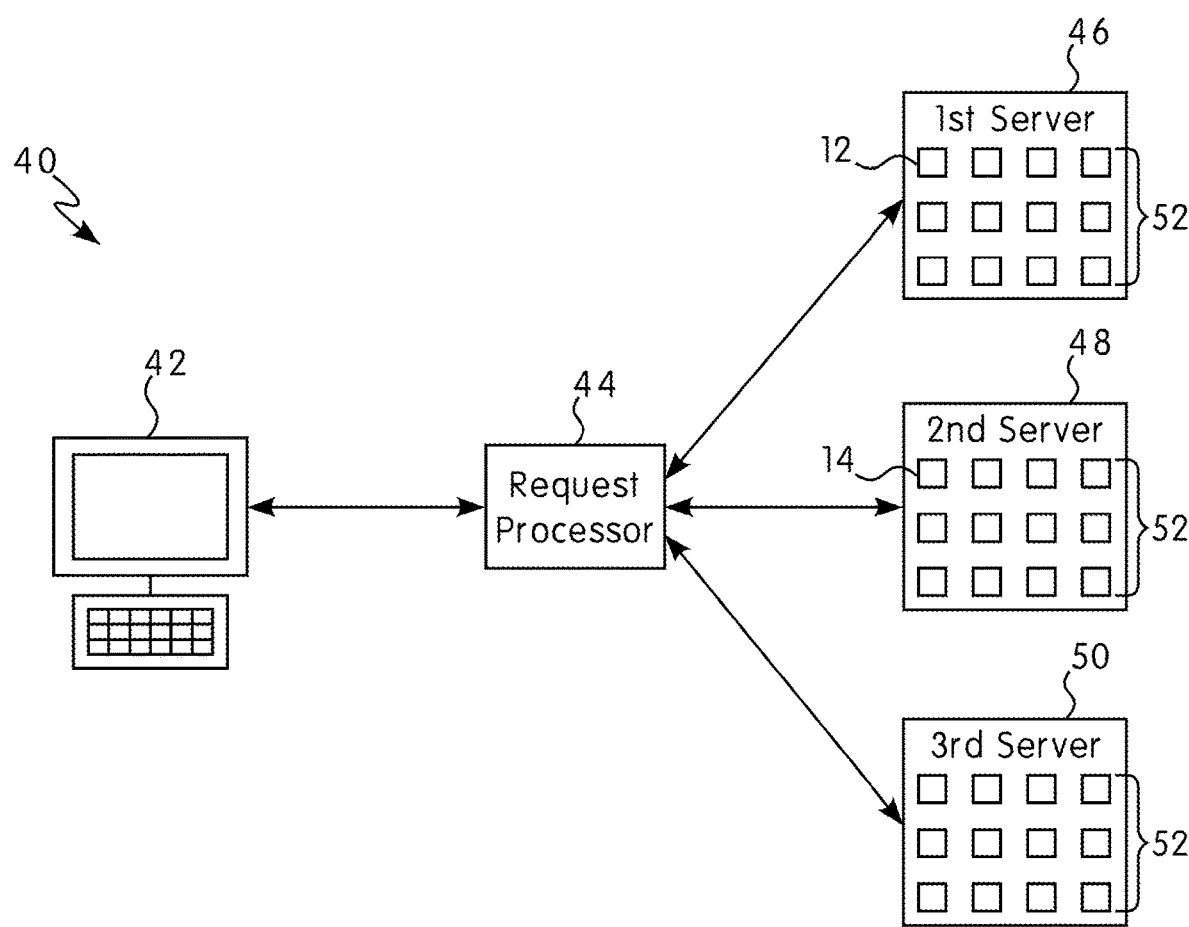
FIG. 2 shows a schematic diagram of a system for preventing duplicate processing of data according to the present invention.

Referring to FIG. 2, a system 40 for preventing duplicate processing of data is shown. The system 40 may include a requesting device 42. The requesting device 42 may be a computing device. The requesting device 42 may be capable of communicating requests for data to be processed. The system 40 may also include a request processor 44. The request processor 44 may be a single processor or multiple processors capable of receiving requests from the requesting device 42, processing those requests, and communicating a response to the requesting device 42 based on the processing of the request.

With continued reference to FIG. 2, the request processor 44 may be in communication with a plurality of servers. For example, the request processor 44 may be in communication with a first server 46, a second server 48, and a third server 50 (and any other number of servers). The servers and the request processor 44 may be components of the same system or may be components of separate systems.

Each server may include a plurality of data structures 52. The plurality of data structures 52 may be as described above in connection with FIG. 1. In one non-limiting example, the first data structure 12 may be stored on the first server 46, while the second data structure 14 may be stored on the second server 48.

Figure 3:
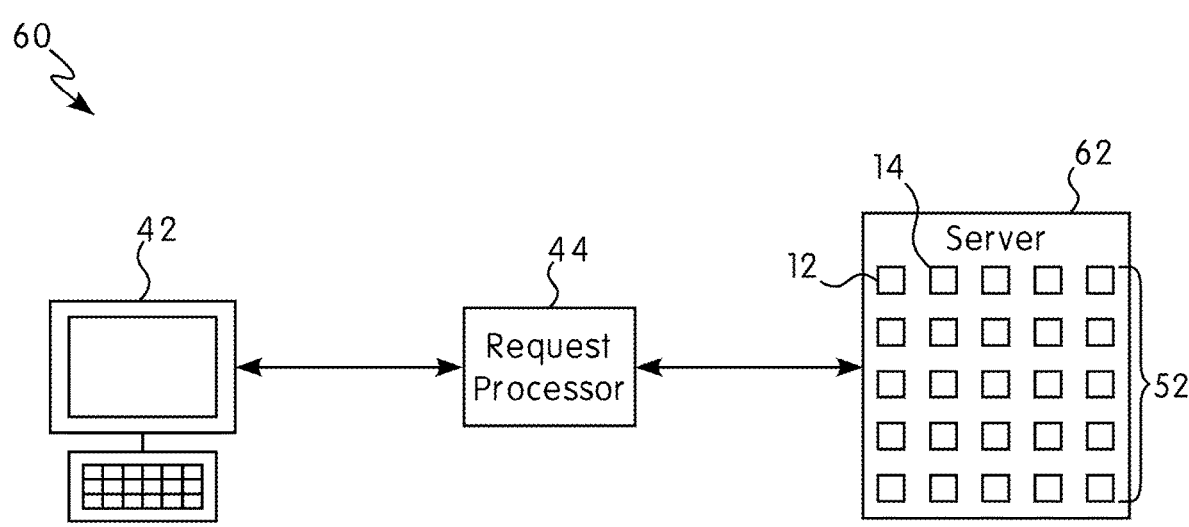
FIG. 3 shows another schematic diagram of a system for preventing duplicate processing of data according to the present invention.

With reference to FIG. 3, a system 60 for preventing duplicate processing of data is shown that is identical to FIG. 2 except that it includes on a single server 62 including a plurality of data structures 52. In this example, the first data structure 12 and the second data structure 14 are stored on the same server 62 (instead of two separate servers as in FIG. 2).

Figure 4:
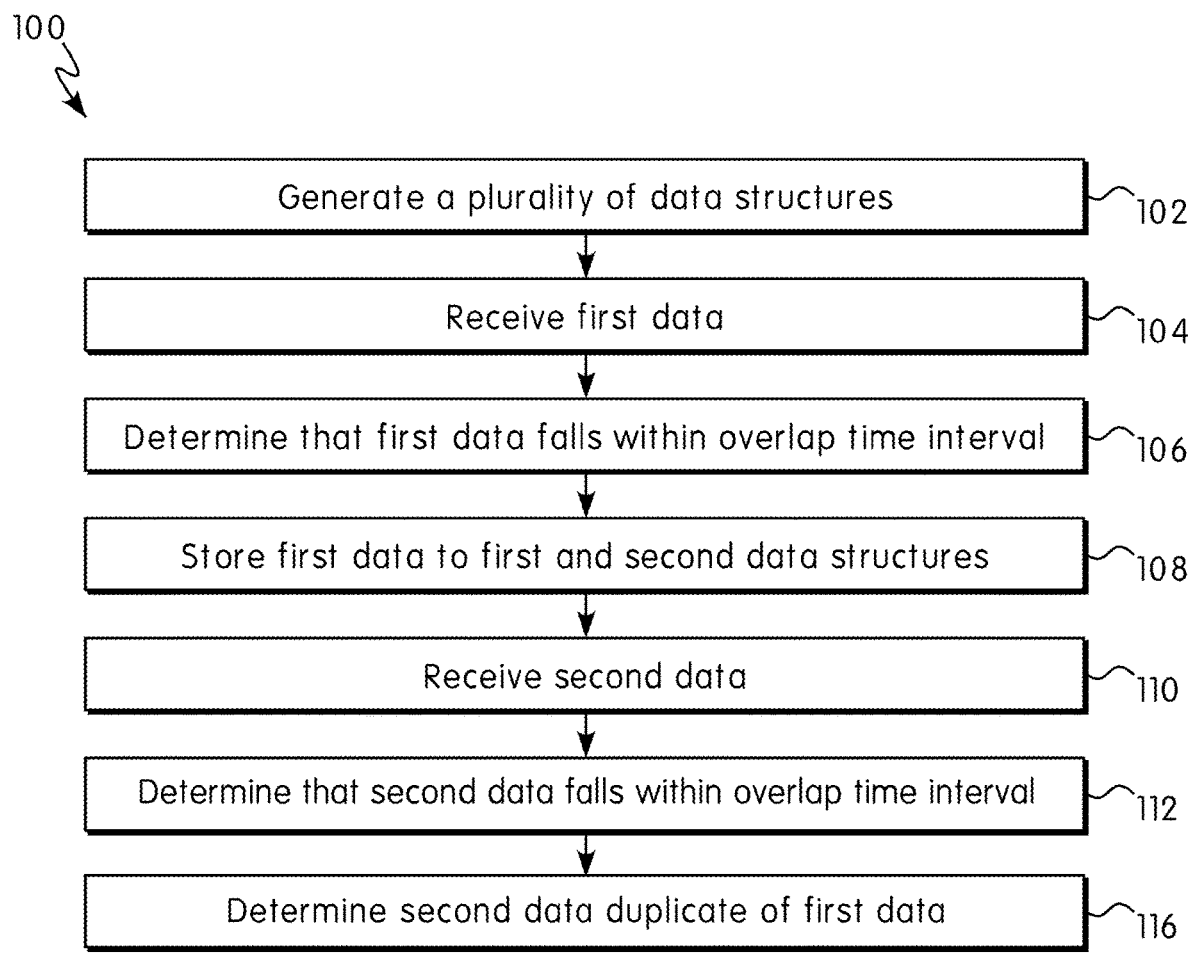
FIG. 4 shows a step diagram of a method for preventing duplicate processing of data according to the present invention.

Referring to FIG. 4 a method 100 for preventing duplicate processing of data is shown. At a first step 102, a processor generates the plurality of data structures 52 (including the first data structure 12 and the second data structure 14). The first data structure 12 and the second data structure 14 are as previously described and include the overlap region 36.

With continued reference to FIG. 4, at a second step 104 a processor receives first data including a first timestamp and a first data ID. The first timestamp may be associated with the time the data was generated, received, processed, transmitted, or any other event associated with the data. In one example, the timestamp will specify the time at which the first data was received and associated with the first data ID. In other examples, the first data ID will have been associated with the first data prior to receiving the first data, such as the first timestamp reflecting a time at which the same or different system received, generated, etc. the first data. The first data ID may be a unique identifier that allows the first data to be identified solely based on that first data ID. The first data ID may be different from the data ID of any other data having a data ID. The first data ID may be any sequence of numbers, characters, symbols, and the like. For example, the first data ID may be a numerical count that increments by a value of one upon the receipt/generation of new data. In another example, the first data ID may be a randomly generated sequence generated at the time the data is received/generated.

With continued reference to FIG. 4, at a third step 106, a processor determines, based on the first timestamp, that the first data falls within the overlap region 36. This may be performed by determining whether the first timestamp is associated with a time defined within the overlap region 36. At a fourth step 108, a processor, upon determining that the first data falls within the overlap region 36, may store the first data to the first data structure 12 and the second data structure 14 (because the overlap region 36 is associated with both the first data structure 12 and the second data structure 14). If the first data is a duplicate of data previously stored, it may not be subsequently stored (because it is a duplicate). However, if the first data is not a duplicate, it may be further processed (as necessary) prior to, during, or after the first data has been stored.

With continued reference to FIG. 4, at a fifth step 110, a processor receives second data including a second timestamp and a second data ID. The second data may be the same or different from the first data (e.g., duplicate data or different data). The second data may be received from the same or a different source (e.g., requesting device 42) as the first data.

With continued reference to FIG. 4, at a sixth step 112, a processor may determine that the second data falls within the overlap time interval. At a seventh step 116, a processor may determine that the first data and the second data are duplicates of one another. This may be at least partially based on the second data ID matching the stored (in the data structure) first data ID. The data IDs of two data entries may indicate that the request to process the data is a duplicate and that the system has already processed that particular data.

Determining that the first data and the second data are duplicates of one another may be determined by the first data structure 12 and/or the second data structure 14. This may include the request processor 44 communicating to the first data structure 12 and/or the second data structure 14 to write the second data to the data structure and the first and/or second data structure 12, 14 determining that the second data is duplicate data to the first data. The first and/or second data structure 12, 14 in this case may communicate to the request processor 44 that the second data has not been stored because it is duplicate data. For example, the first and/or second data structure 12, 14 may return a value indicating that the entry is duplicative. As an example, in response to an operation to insert the second data into the first data structure and/or the second data structure 12, 14, the data structure(s) may return a value indicating that the second data is a duplicate. The return may be provided by the programmatic functionality of the data structure(s) itself, and may be binary to indicate whether the insertion operation succeeded or failed. A failed return in such an example indicates that there is a duplicate.

In some examples, determining that the first data and the second data are duplicates of one another may be determined by the request processor 44 querying the first and/or the second data structures 12, 14 associated with the overlap time interval. In some examples, the request processor 44 may query only the relevant data structure (a relevant data structure being a data structure that is associated with the overlap time interval) that includes data temporally later than the latest data in the temporally preceding data structure having the overlap time interval.

Upon determining that the second data is a duplicate of the first data, the request processor 44 may initiate at least one suitable response. In one example, the request processor 44 terminates processing of the second data because the second data is a duplicate of the first data, which has already been processed. Thus, the system may save processing time and increase efficiency by not processing (terminating processing) the second data.

In another example, upon determining that the second data is duplicate of the first data, the request processor 44 may generate and communicate a duplicate response message to the requesting device 42. The duplicate response message may include data that identifies the second data as identical to the first data. The duplicate response message may indicate that the second data was not processed because it was previously processed as the first data. The duplicate response message may be identical to the response message sent to the requesting device 42 after processing the first data.

In another example, upon determining that the second data is duplicate of the first data, the system may forgo querying remaining data structures (data structures other than first data structure 12 and/or the second data structure). Since the first data structure 12 and/or the second data structure was queried, the remaining data structures are not be queried because the system of the present invention ensures that the data would have been stored in the first data structure 12 and/or the second data structure. This feature reduces overall querying time and efficiency of the computer system.

A computer program product is also contemplated for preventing duplication of data processing, the computer program product including at least one non-transitory computer-readable medium including program instructions that, when executed by at least one computer including at least one processor, causes the at least one processor to effect the method steps as outlined in FIG. 4 and described above.

While the present invention has been described thus far as preventing duplication of data processing, it will be appreciated that the data can be data associated with any number of activities, including, but not limited to, data associated with payment transactions, tokens issued for temporary use in connection with a payment transaction, a password issued for temporary use in connection with a user account, an offer issued for temporary use redeemable with a payment transaction, and the like. Specific implementations of the present invention for these relevant types of data is hereinafter described.

Processing of Payment Transactions

Non-limiting embodiments or aspects of the present invention are directed to a method, system and computer program product for preventing duplicate processing of a payment transaction. The advantages of this non-limiting embodiment or aspect include the previously-described advantages of the method, system, and computer program product for preventing duplication of data processing. The present invention ensures that duplicate transaction processing request messages are identified such that payment transactions that have already been processed are not re-processed. This allows the system to be less error prone such that the computer system (or other computer systems) are not later required to correct mistakes associated with processing a payment transaction multiple times (such as transfer money back to the original accounts). The present invention also allows for detection of potentially fraudulent transaction processing request messages that are communicating a duplicate payment transaction to the computer system for processing in order to fraudulently obtain funds resulting from duplicate processing of the payment transaction. Upon detection of potentially fraudulent activity, protocols can be initiated to prevent the fraudulent activity or detect its source.

Figure 5:
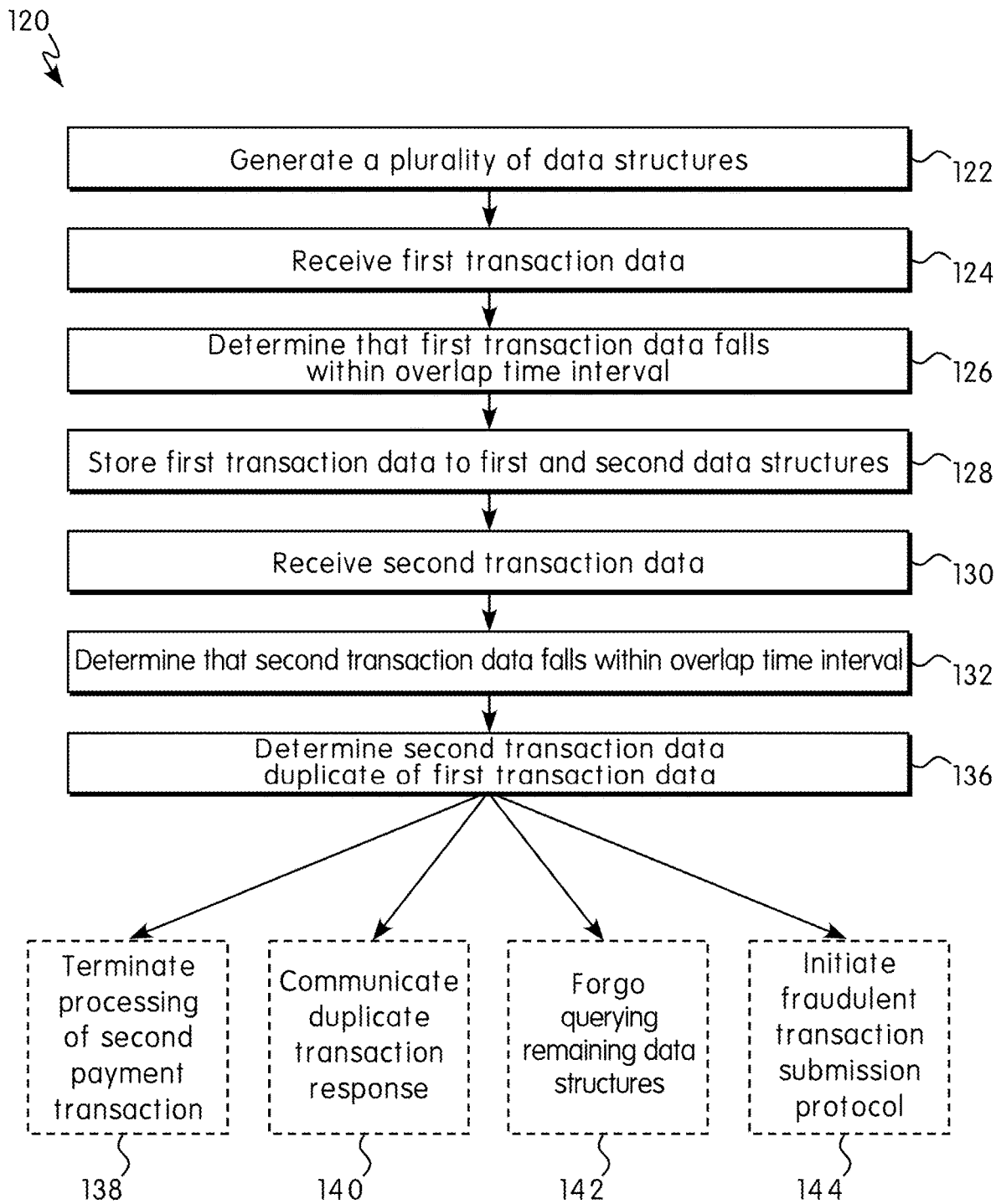
FIG. 5 shows a step diagram of a method for preventing duplicate processing of a payment transaction according to the present invention.

Referring to FIG. 5, a method 120 for preventing duplicate processing of a payment transaction is shown. At a first step 122, a processor generates a plurality of data structures 52 (including the first data structure 12 and the second data structure 14). The first data structure 12 and the second data structure 14 are as previously described and include the overlap region 36. The first step 122 is identical to the first step 102 from the method 100 described in FIG. 4 except the data in the method 120 is specifically associated with a payment transaction between a user and a merchant initiated using a portable financial device.

Referring to FIG. 6, the first data structure 12 (and all other data structures included therewith) is shown. The first data structure 12 may store the data associated with payment transactions (transaction data). The transaction data may include a PAN number 146 (or other account identifier), a transaction ID 148, and a timestamp 150. The transaction ID 148 may be a unique identifier that allows the payment transaction to be identified solely based on that transaction ID 148. The transaction ID 148 may take any form, as previously discussed in connection with the first data ID. The timestamp 150 may associate the payment transaction with a specific time, such as the time the payment transaction was initiated. However, the timestamp 150 may be assigned based on other events occurring during processing of the payment transaction, such as when the payment transaction was received by a certain party/system (e.g., merchant system, transaction service provider, issuer, and the like), when the transaction ID was generated for association with a particular payment transaction, when the payment transaction was transmitted from one party/system to another party/system, and the like. Other transaction data may be included in the data structure, such as: cardholder information (e.g., name, contact information, demographics, etc.), merchant information (e.g., merchant name, merchant ID, merchant bank identification number (BIN), etc.), information about the goods/services purchased (e.g., type of goods, quantity of goods, price of goods, UPC code, etc.), information about the portable financial device (e.g., expiration data, cvv code, spend limit, etc.), and other information that may be included for processing transactions initiated using a portable financial device (e.g., ISO defined data elements according to ISO 8583).

Referring back to FIG. 1 the predetermined time intervals ($T_1$, $T_2$, and T3) may be the same or different in length and may be of any length appropriate for storage of transaction data. In one example, the predetermined time intervals may include at least one month, such as at least two months, one quarter, six months, or twelve months. In one example, the predetermine time interval is approximately one month, and all payment transactions initiated during a calendar month (plus the overlap region 36) are associated with the predetermined time interval. The overlap regions 36 may be the same or different and may be any overlap length appropriate for capturing payment transactions that may have been delayed in their initiation and/or storage due to computer system malfunction. The overlap region 36 may be shorter than the predetermined time intervals. The overlap region may range from 1 minute in length to 1 day in length, such as 1 or 2 hours.

Referring back to FIG. 5, the method 120 may further include a second step 124 of receiving first transaction data. The first transaction data may include any of the previously described transaction data, such as a first PAN number, a first transaction ID, and/or a first timestamp. At a third step 126, a processor determines, based on the first timestamp, that the first transaction data falls within the overlap region 36. This may be performed by determining whether the first timestamp is associated with a time defined within the overlap region 36. At a fourth step 128, a processor, upon determining that the first transaction data falls within the overlap region 36, may store the first transaction data to the first data structure 12 and the second data structure 14 (because the overlap region 36 is associated with both the first data structure 12 and the second data structure 14). If the first transaction data is a duplicate of transaction data previously stored, it may not be subsequently stored (because it is a duplicate). However, if the first transaction data is not a duplicate, it may be further processed prior to, during, or after the first transaction data has been stored. Further processing may include authorization, clearing, and settling of the payment transaction.

With continued reference to FIG. 5, at a fifth step 130, a processor receives second transaction data including a second PAN number, a second timestamp, and/or a second transaction ID. The second transaction data may be the same or different from the first transaction data (e.g., duplicate data or different data). The second transaction data may be received from the same or a different source (e.g., requesting device 42) as the first transaction data. For example, the first transaction data and the second transaction data may be received by the request processor 44 from a merchant system, with the second payment transaction being received based on the merchant system malfunctioning and inadvertently (not fraudulently) re-submitting the first transaction data as second transaction data. In another non-limiting example, the first transaction data may be received from the merchant system, and the second transaction data may be received by a fraudulent system (different from the initial merchant system) intending to receive funds by the request processor 44 not determining that the first transaction data and second transaction data are identical and re-processing the second transaction data.

With continued reference to FIG. 5, at a sixth step 132, a processor may determine that the second transaction data falls within the overlap time interval. At a seventh step 136, a processor may determine that the first transaction data and the second transaction data are duplicates of one another. This may be at least partially based on the second transaction ID matching the stored (in the data structure) first transaction ID. The transaction IDs of two data entries may indicate that the request to process the transaction data is a duplicate and that the system has already processed that particular transaction data.

Determining that the first transaction data and the second transaction data are duplicates of one another may be determined by the first data structure 12 and/or the second data structure 14. This may include the request processor 44 communicating to the first data structure 12 and/or the second data structure 14 to write the second transaction data to the data structure and the first and/or second data structure 12, 14 determining that the second transaction data is duplicate to the first transaction data. The first and/or second data structure 12, 14 in this case may communicate to the request processor 44 that the second transaction data has not been stored because it is a duplicate payment transaction. For example, the first and/or second data structure 12, 14 may return a value indicating that the entry is duplicative. As an example, in response to an operation to insert the second transaction data into the first data structure and/or the second data structure 12, 14, the data structure(s) may return a value indicating that the second transaction data is a duplicate. The return may be provided by the programmatic functionality of the data structure(s) itself, and may be binary to indicate whether the insertion operation succeeded or failed. A failed return in such an example indicates that there is a duplicate.

In some examples, determining that the first transaction data and the second transaction data are duplicates of one another may be determined by the request processor 44 querying the first and/or the second data structures 12, 14 associated with the overlap time interval. In some examples, the request processor 44 may query only the relevant data structure that includes transaction data temporally later than the latest transaction data in the temporally preceding data structure having the overlap time interval.

Upon determining that the second transaction data is a duplicate of the first transaction data, the request processor 44 may initiate a suitable response, as follows.

With continued reference to FIG. 5, at a step 8*a* 138, the request processor 44 may terminate processing of the second payment transaction. This may include the second payment transaction not being authorized, cleared, and settled. At a step 8*b* 140, the request processor 44 may generate and communicate a duplicate transaction response message to the requesting device 42. The duplicate transaction response message may include data that identifies the second transaction data as identical to the first transaction data. The duplicate transaction response message may indicate that the second transaction data was not processed because it was previously processed as the first transaction data. The duplicate transaction response message may be identical to the transaction response message sent to the requesting device 42 after processing the first transaction data.

At a step 8*c* 142, upon determining that the second transaction data is duplicate of the first transaction data, the system may forgo querying remaining data structures (data structures other than first data structure 12 and/or the second data structure). Since the first data structure 12 and/or the second data structure was queried, the remaining data structures are not be queried because the system of the present invention ensures that the transaction data would have been stored in the first data structure 12 and/or the second data structure. This feature reduces overall querying time and efficiency of the computer system.

At a step 8*d* 144 the request processor 44 may initiate a fraudulent transaction submission protocol. This protocol may initiate at least one step that allows the submission of the second transaction data to be reviewed for potential fraud. This may include transmitting a message to the transaction service provider and/or the issuer of the portable financial device associated with the second transaction data that notifies of this potential fraud. The request processor 44 may also notify the cardholder of potential fraud by communicating with the cardholder, such as by email, phone call, text message, or other communication means. The request processor 44 may temporally halt any further transaction activity associated with the portable financial device associated with the second transaction data until the potential fraud is investigated.

Each of these potential steps 138-144 initiated by the request processor 44 may enhance the overall efficiency of the computer system and the security associated with each cardholder account.

Figure 7A:
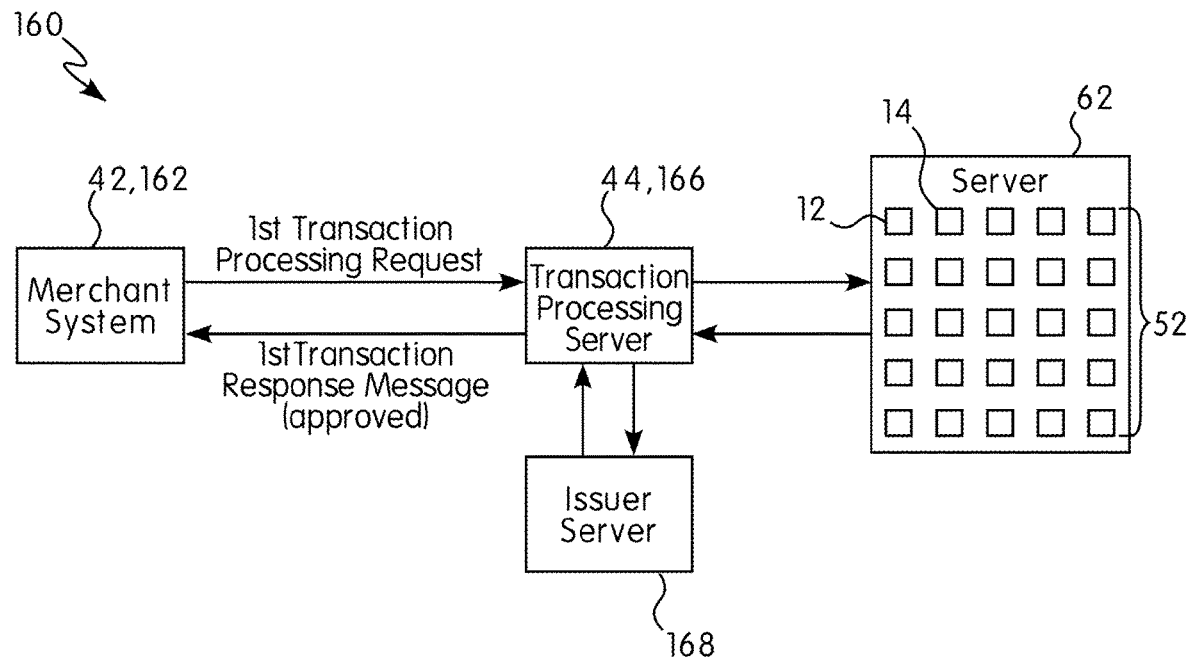
FIG. 7A shows a schematic diagram of a system for preventing duplicate processing of a payment transaction, the system processing a first request for processing the payment transaction according to the present invention.

Referring to FIG. 7A, a system 160 for preventing duplicate processing of a payment transaction, the system 160 processing a first request for processing the payment transaction, is shown. The system 160 may include a merchant system 162 operated by or on behalf of a merchant engaging in payment transactions with users (cardholders). The merchant system 162 may be a merchant POS system. The merchant system 162 may include the features of the previously described requesting device 42.

The merchant system 162 may be in communication with a transaction processing server 166 operated by or on behalf of a transaction service provider. The merchant system 162 may transmit transaction processing requests including transaction data to the transaction processing server 166 to request processing of payment transactions. The transaction processing server 166 may include the features of the previously described request processor 44. The transaction processing server 166 may be in communication with an issuer server 168 operated by or on behalf of an issuer of a portable financial device (issued to the user). The merchant system 162, transaction processing server 166, and issuer server 168 may be in communication with one another to process payment transactions, such as to authorize, clear, and settle the payment transactions.

With continued reference to FIG. 7A, the system 160 may further include at least one server 62, as previously described (the example in FIG. 7A includes a single server, but it will be appreciated that multiple servers 46, 48, 50 may be included). In the non-limiting example shown in FIG. 7A, the server 62 is in communication with the transaction processing server 166; however, it will be appreciated that the server may instead or in addition be in communication with the issuer server 168. The server 62 may be operated by or on behalf of the transaction service provider and/or the issuer. The server 62 includes data structures 52 including the first data structure 12 and the second data structure 14. In some examples, the system 160 may include multiple servers, and the first data structure 12 and the second data structure 14 may be stored on separate servers.

With continued reference to FIG. 7A, the merchant system 162 may communicate a first transaction processing request including a request to process a first payment transaction including first transaction data to the transaction processing server 166. The transaction processing server 166 may execute the method 120 described in FIG. 5 and determine that the first transaction data is not duplicate transaction data and has not been processed. The transaction processing server 166 may then communicate with the issuer server 168 to process the first payment transaction. The issuer server 168 may determine whether the first payment transaction should be authorized (approved or declined) and communicate its authorization decision to the transaction processing server 166. The transaction processing server 166 may communicate a first transaction response message to the merchant system 162 which communicates that the first payment transaction has been approved/declined and/or the that the first transaction data has been processed.

Figure 7B:
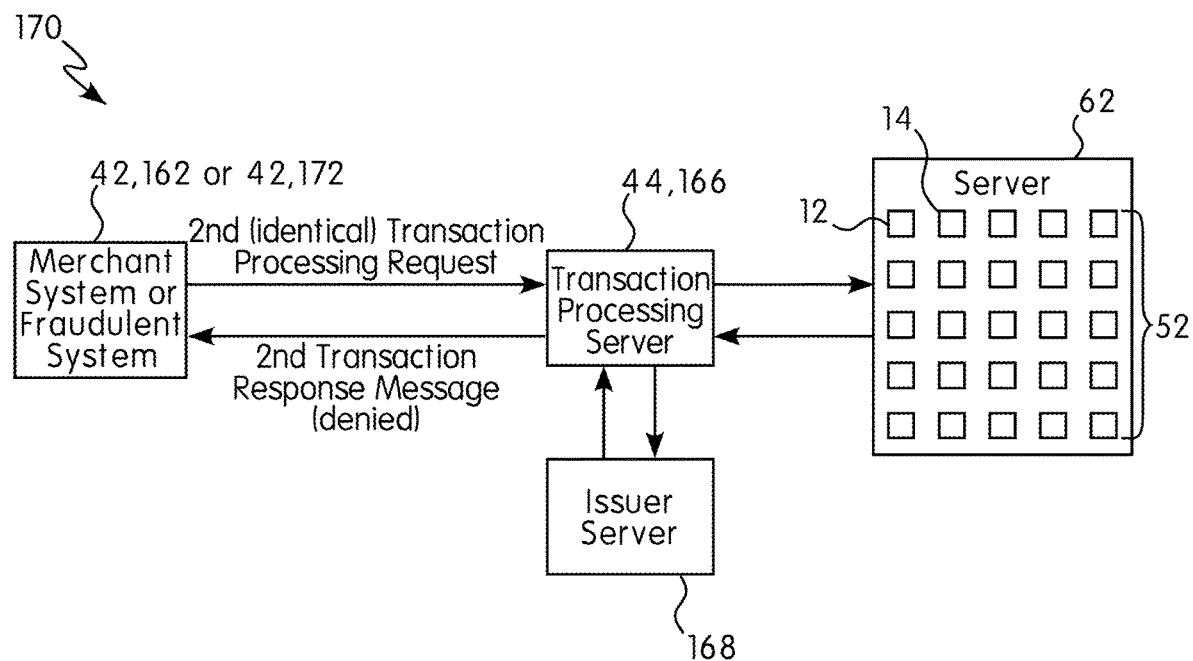
FIG. 7B shows a schematic diagram of a system for preventing duplicate processing of a payment transaction, the system processing a second duplicate request for processing the payment transaction according to the present invention.

Referring to FIG. 7B, the merchant system 162 may communicate a second transaction processing request including a request to process a second payment transaction including second transaction data to the transaction processing server 166. The second payment transaction (and second transaction data thereof) and first payment transaction (and first transaction data thereof) are identical in this example. The transaction processing server 166 may execute the method 120 described in FIG. 5 and determine that the second transaction data is a duplicate of the first transaction data. The transaction processing server 166 may then communicate a second transaction response message to the merchant system 162 to communicate that the request to process the second payment transaction is denied and may indicate that the second transaction data is a duplicate of the first transaction data, which was already processed. The transaction processing server 166 or other components of the system 170 may initiate further action as described in connection with the steps 9a-9d in the method 120 of FIG. 5. In some non-limiting examples, the merchant system 162 in FIG. 7B is the same as the merchant system 162 in FIG. 7A, and the merchant system 162 may have inadvertently (not fraudulently) resent the second transaction data to the transaction processing server 166, for instance, because of the merchant system 162 malfunctioning. However, in other non-limiting embodiments, the merchant system 172 from FIG. 7A may be replaced with a fraudulent system 172 in FIG. 7B, which is a system operated by or on behalf of an individual or entity intending to perpetrate a fraud (by receiving funds from re-processing the second transaction data). Thus, the system 170 may prevent inadvertent duplicate transaction processing requests or malevolent (fraudulent) duplicate transaction processing requests.

A computer program product is also contemplated for preventing duplicate processing of a payment transaction, the computer program product including at least one non-transitory computer-readable medium including program instructions that, when executed by at least one computer including at least one processor, causes the at least one processor to effect the method steps as outlined in FIG. 5, and systems 160, 170 from FIGS. 7A-7B, and described above.

Processing of Temporary Tokens

Non-limiting embodiments or aspects of the present invention are directed to a method, system and computer program product for preventing duplicate processing of a token issued for temporary use. The advantages of this non-limiting embodiment or aspect include the previously-described advantages of the method, system, and computer program product for preventing duplication of data processing. The present invention ensures that duplicate token processing request messages are identified such that tokenized transactions that have already been processed are not re-processed. This allows the system to be less error prone such that the computer system (or other computer systems) are not later required to correct mistakes associated with processing a tokenized transaction multiple times (such as transfer money back to the original accounts). The present invention also allows for detection of potentially fraudulent token processing request messages that are communicating a duplicate tokenized transaction to the computer system for processing in order to obtain funds resulting from duplicate processing of the tokenized transaction. Upon detection of potentially fraudulent activity, protocols can be initiated to prevent the fraudulent activity or detect its source.

Figure 8:
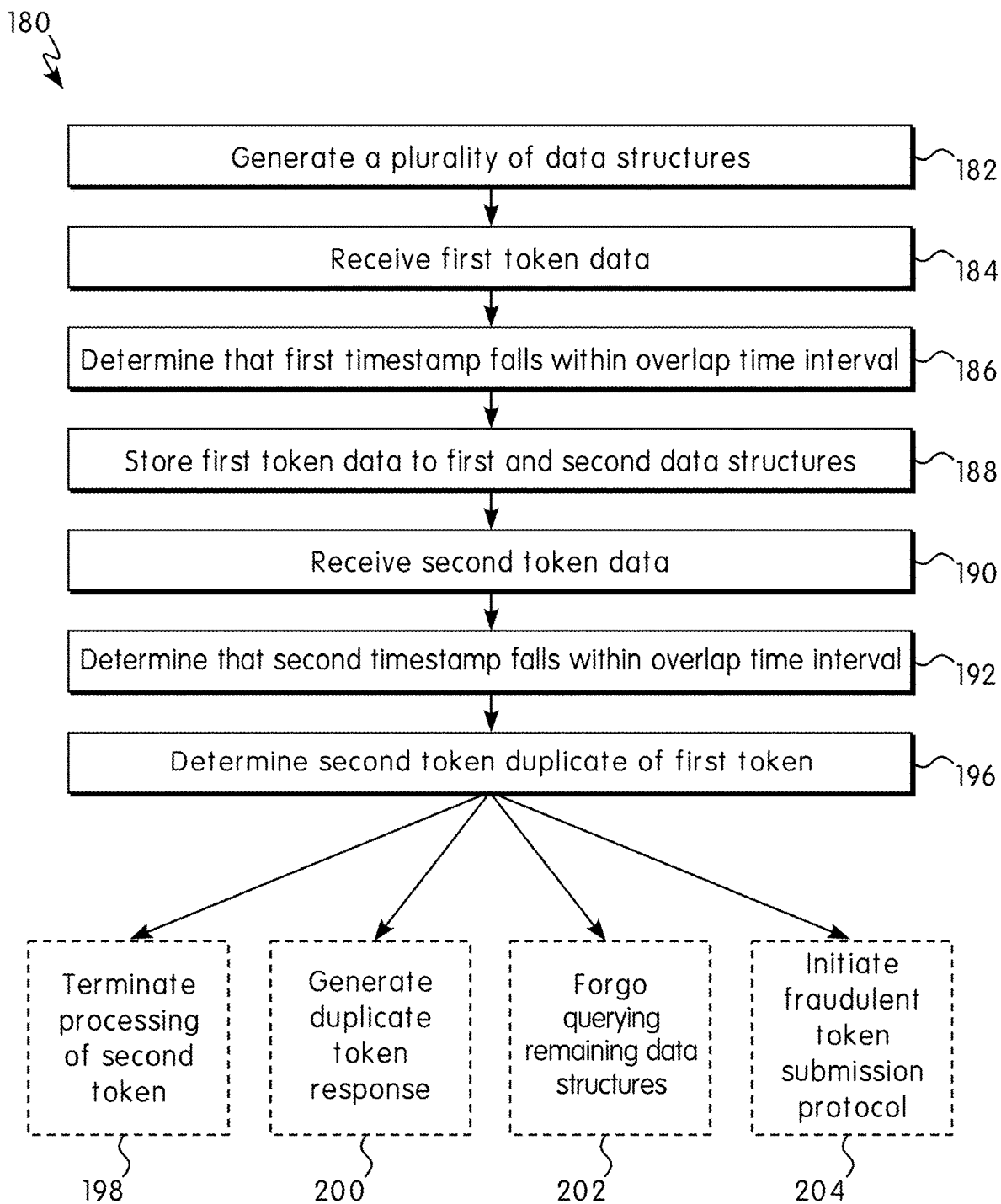
FIG. 8 shows a step diagram of a method for preventing duplicate processing of a token assigned for temporary use according to the present invention.

Referring to FIG. 8, a method 180 for preventing duplicate processing of a token assigned for temporary use is shown. The token may be a substitute account identifier for a PAN number to initiate and/or process a payment transaction, and the token may have an expiration date, such that it is no longer valid for initiating and/or processing a payment transaction after its expiration. The token may be associated with a PAN number or be generated for use with a single transaction associated with the PAN number.

At a first step 182, a processor generates a plurality of data structures 52 (including the first data structure 12 and the second data structure 14). The first data structure 12 and the second data structure 14 are as previously described and include the overlap region 36. The first step 182 is identical to the first step 102 from the method 100 described in FIG. 4 except the data in the method 120 is specifically associated with a tokenized payment transaction using a token assigned for temporary use.

Figure 9:
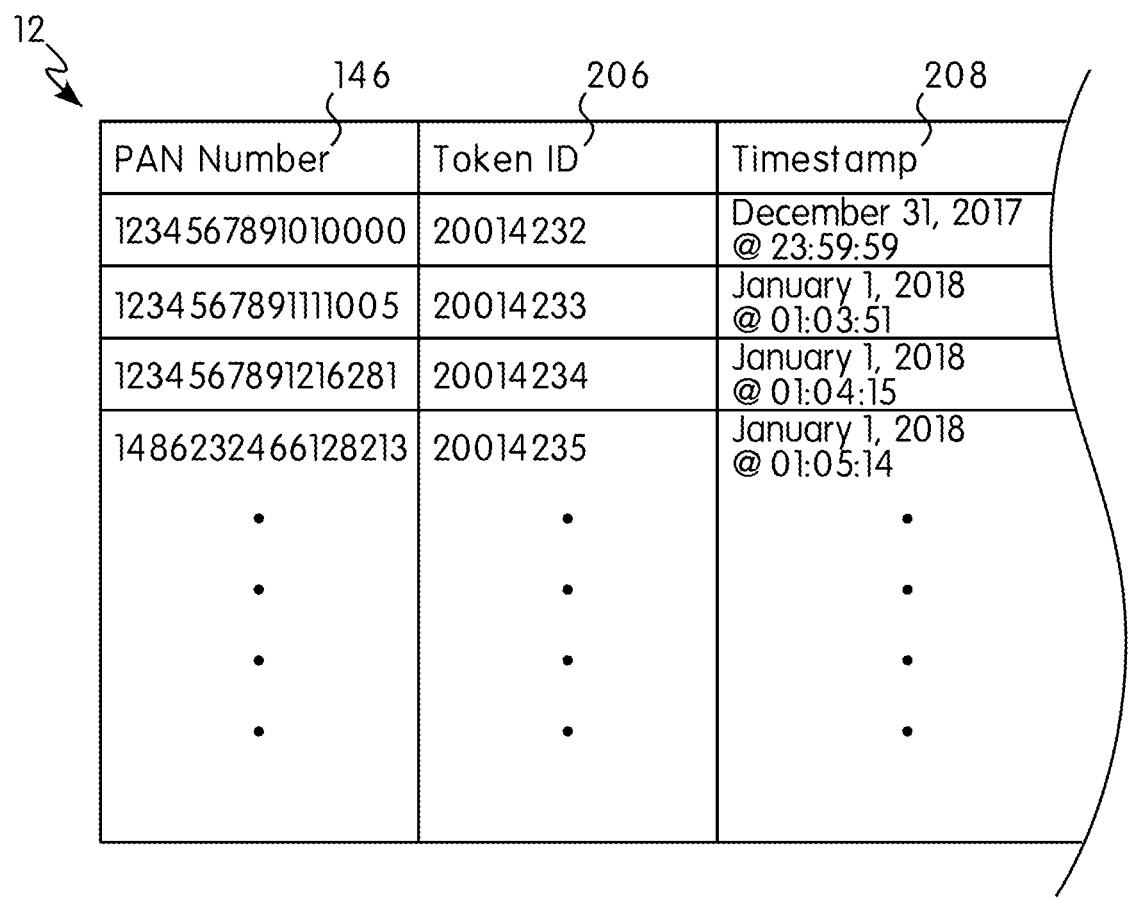
FIG. 9 shows a data structure for data associated with a token assigned for temporary use according to the present invention.

Referring to FIG. 9, the first data structure 12 (and all other data structures included therewith) is shown. The first data structure 12 may store the data associated with token. The token data may include a PAN number 146 (or other account identifier), a token ID 206, and a timestamp 208. The token ID 206 may be a unique identifier that allows the tokenized transaction to be identified solely based on that token ID 206. The token ID 206 may take any form, as previously discussed in connection with the first data ID. The timestamp 208 may associate the tokenized transaction with a specific time, such as the time the tokenized transaction was initiated and/or the token generated and assigned. However, the timestamp 208 may be assigned based on other events occurring during processing of the tokenized transaction, such as when the tokenized transaction was received by a certain party (e.g., merchant system, transaction service provider, issuer, and the like) when the tokenized transaction was transmitted from one party to another party, and the like. Other token data may be included in the data structure, such as: cardholder information of the user in the tokenized transaction (e.g., name, contact information, demographics, etc.), merchant information of the merchant in the tokenized transaction (e.g., merchant name, merchant ID, merchant bank identification number (BIN), etc.), information about the goods/services purchased in the tokenized transaction (e.g., type of goods, quantity of goods, price of goods, UPC code, etc.), information about the portable financial device associated with the token (e.g., expiration data, cvv code, spend limit, etc.), and other information that may be included for processing tokenized transactions initiated using a portable financial device (e.g., ISO defined data elements according to ISO 8583).

Referring back to FIG. 1 the predetermined time intervals ($T_1$, $T_2$, and T3) may be the same or different in length and may be of any length appropriate for storage of a temporary token. In one example, the predetermined time intervals may include at least one month, such as at least two months, one quarter, six months, or twelve months. In one example, the predetermine time interval is approximately one month, and all tokens assigned during a calendar month (plus the overlap region 36) are associated with the predetermined time interval. The overlap regions 36 may be the same or different and may be any overlap length appropriate for capturing assignment of temporary tokens that may be been delayed in their generation and/or storage due to computer system malfunction. The overlap region 36 may be shorter than the predetermined time intervals. The overlap region may range from 1 minute in length to 1 day in length, such as 1 hour.

Referring back to FIG. 8, the method 180 may further include a second step 184 of receiving first token data. A processor may determine whether the first token associated with the first token data is an expired token. The first token data may include any of the previously described token data, such as a first PAN number, a first token ID, and/or a first timestamp. At a third step 186, a processor determines based on the first timestamp that the first token data falls within the overlap region 36. This may be performed by determining whether the first timestamp is associated with a time defined within the overlap region 36. At a fourth step 188, a processor, upon determining that the first token data falls within the overlap region 36, may store the first token data to the first data structure 12 and the second data structure 14 (because the overlap region 36 is associated with both the first data structure 12 and the second data structure 14). If the first token data is a duplicate of token data previously stored, it may not be subsequently stored (because it is a duplicate). However, if the first token data is not a duplicate, it may be processed prior to, during, or after the first token data has been stored, such as authorization, clearing, and settling of the tokenized transaction.

With continued reference to FIG. 8, at a fifth step 190, a processor receives second token data including a second PAN number, a second timestamp and/or a second token ID. A processor may determine whether the second token associated with the second token data is an expired token. The second token data may be the same or different from the first token data (e.g., duplicate data or different data). The second token data may be received from the same or a different source (e.g., requesting device 42) as the first token data. For example, the first token data and the second token data may be received by the request processor 44 from a merchant system, with the second tokenized transaction being received based on the merchant system malfunctioning and inadvertently re-submitting the first token data as second token data. In another non-limiting example, the first token data may be received from the merchant system, and the second token data may be received by a separate fraudulent system intending to receive funds by the request processor 44 not determining that the first token data and second token data are identical and re-processing the second token data.

With continued reference to FIG. 8, at a sixth step 192, a processor may determine that the second token data falls within the overlap time interval. At a seventh step 196, a processor may determine that the first token data and the second token data are duplicates of one another. This may be at least partially based on the second token ID matching the stored (in the data structure) first token ID. The token IDs of two data entries may indicate that the request to process the token data is a duplicate and that the system has already processed that particular token data.

Determining that the first token data and the second token data are duplicates of one another may be determined by the first data structure 12 and/or the second data structure 14. This may include the request processor 44 communicating to the first data structure 12 and/or the second data structure 14 to write the second token data to the data structure and the first and/or second data structure 12, 14 determining that the second token data is duplicate to the first token data. The first and/or second data structure 12, 14 in this case may communicate to the request processor 44 that the second token data has not been stored because it is a duplicate token. For example, the first and/or second data structure 12, 14 may return a value indicating that the entry is duplicative. As an example, in response to an operation to insert the second token data into the first data structure and/or the second data structure 12, 14, the data structure(s) may return a value indicating that the second token data is a duplicate. The return may be provided by the programmatic functionality of the data structure(s) itself, and may be binary to indicate whether the insertion operation succeeded or failed. A failed return in such an example indicates that there is a duplicate.

In some examples, determining that the first token data and the second token data are duplicates of one another may be determined by the request processor 44 querying the first and/or the second data structures 12, 14 associated with the overlap time interval. In some examples, the request processor 44 may query only the relevant data structure that includes token data temporally later than the latest token data in the temporally preceding data structure having the overlap time interval.

Upon determining that the second token data is a duplicate of the first token data, the request processor 44 may initiate a suitable response, as follows.

With continued reference to FIG. 8, at a step 8a 198, the request processor 44 may terminate processing of the second tokenized transaction. This may include the second tokenized transaction not being authorized cleared, and settled. At a step 8b 200, the request processor 44 may generate and communicate a duplicate token response message to the requesting device 42. The duplicate token response message may include data that identifies the second token data as identical to the first token data. The duplicate token response message may indicate that the second token data was not processed because it was previously processed as the first token data. The duplicate token response message may be identical to the token response message sent to the requesting device 42 after processing the first token data.

At a step 8c 202, upon determining that the second token data is duplicate of the first token data, the system may forgo querying remaining data structures (data structures other than first data structure 12 and/or the second data structure). Since the first data structure 12 and/or the second data structure was queried, the remaining data structures are not be queried because the system of the present invention ensures that the token data would have been stored in the first data structure 12 and/or the second data structure. This feature reduces overall querying time and efficiency of the computer system.

At a step 8d 204 the request processor 44 may initiate a fraudulent token submission protocol. This protocol may initiate at least one step that allows the submission of the second token data to be reviewed for potential fraud. This may include transmitting a message to the transaction service provider and/or the issuer of the token associated with the second token data that notifies of this potential fraud. The request processor 44 may also notify the cardholder (associated with the token) of potential fraud by communicating with the cardholder, such as by email, phone call, text message, or other communication means. The request processor 44 may temporally halt any further transaction activity associated with the portable financial device associated with the second token data until the potential fraud is investigated.

Each of these potential steps 198-204 initiated by the request processor 44 may enhance the overall efficiency of the computer system and the security associated with each cardholder account.

Figure 10A:
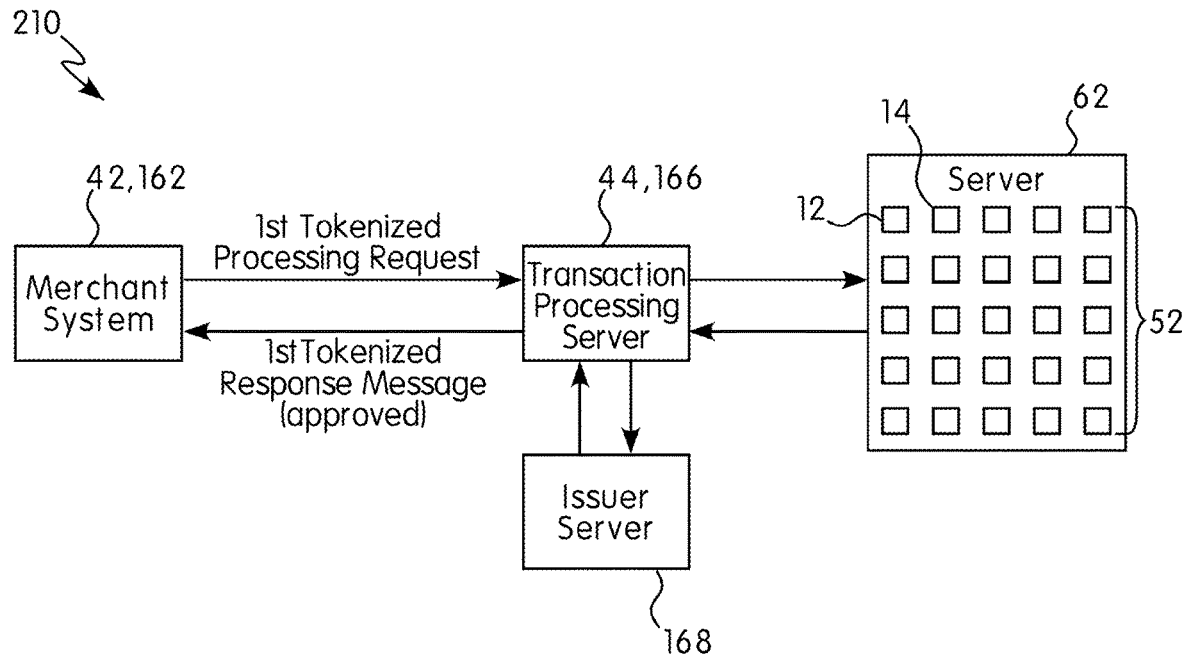
FIG. 10A shows a schematic diagram of a system for preventing duplicate processing of a token assigned for temporary use, the system processing a first request for processing the token according to the present invention.

Referring to FIG. 10A, the system 210 is identical to the system 160 from FIG. 7A except in the following ways. The merchant system 162 in FIG. 10A may communicate a first tokenized processing request including a request to processes a first tokenized transaction including first token data to the transaction processing server 166. The transaction processing server 166 may execute the method 180 described in FIG. 8 and determine that the first token data is not duplicate data and has not been processed. The transaction processing server 166 may then communicate with the issuer server 168 to process the first tokenized transaction.

The issuer server 168 may determine whether the first tokenized transaction should be authorized (approved or denied) and submit its authorization decision to the transaction processing server 166. The transaction processing server 166 may communicate a first tokenized response message to the merchant system 162 which communicates that the first tokenized transaction has been approved and/or the that the first tokenized data has been processed.

Figure 10B:
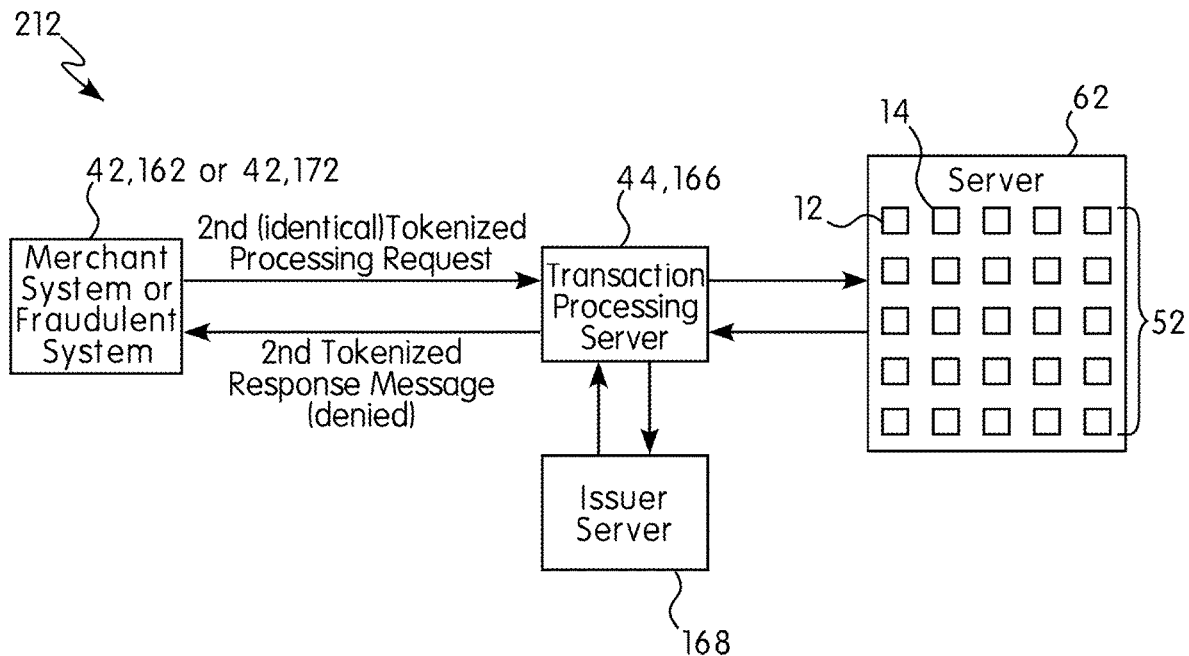
FIG. 10B shows a schematic diagram of a system for preventing duplicate processing of a token assigned for temporary use, the system processing a second duplicate request for processing the token according to the present invention.

Referring to FIG. 10B, the system 212 is identical to the system 170 from FIG. 7B except in the following ways. The merchant system 162 or fraudulent system 172 may communicate a second tokenized processing request including a request to process a second tokenized transaction including second token data to the transaction processing server 166. The second tokenized transaction (and second token data thereof) and first tokenized transaction (and first token data thereof) are identical in this example. The transaction processing server 166 may execute the method 180 described in FIG. 8 and determine that the second token data is a duplicate of the first token data. The transaction processing server 166 may then communicate a second tokenized response message to the merchant system 162 or fraudulent system 172 to communicate that the request to process the second tokenized transaction is denied and may indicate that the second token data is a duplicate of the first token data, which was already processed.

A computer program product is also contemplated for preventing duplicate processing of a token issued for temporary use, the computer program product including at least one non-transitory computer-readable medium including program instructions that, when executed by at least one computer including at least one processor, causes the at least one processor to effect the method steps as outlined in FIG. 8, and systems 210, 212 from FIGS. 10A-10B, and described above.

Processing of Temporary Passwords

Non-limiting embodiments or aspects of the present invention are directed to a method, system and computer program product for preventing duplicate processing of a password issued for temporary use. The advantages of this non-limiting embodiment or aspect include the previously-described advantages of the method, system, and computer program product for preventing duplication of data processing. The present invention ensures that duplicate password processing request messages are identified such that the password cannot be used more than a single time to login to a user account. This allows the system to be less error prone and allows the user account to be more secure. The present invention also allows for detection of potentially fraudulent password processing request messages, such as subsequent login attempts using the temporary password by an identity thief. Upon detection of potentially fraudulent activity, protocols can be initiated to prevent the fraudulent activity or detect its source.

Figure 11:
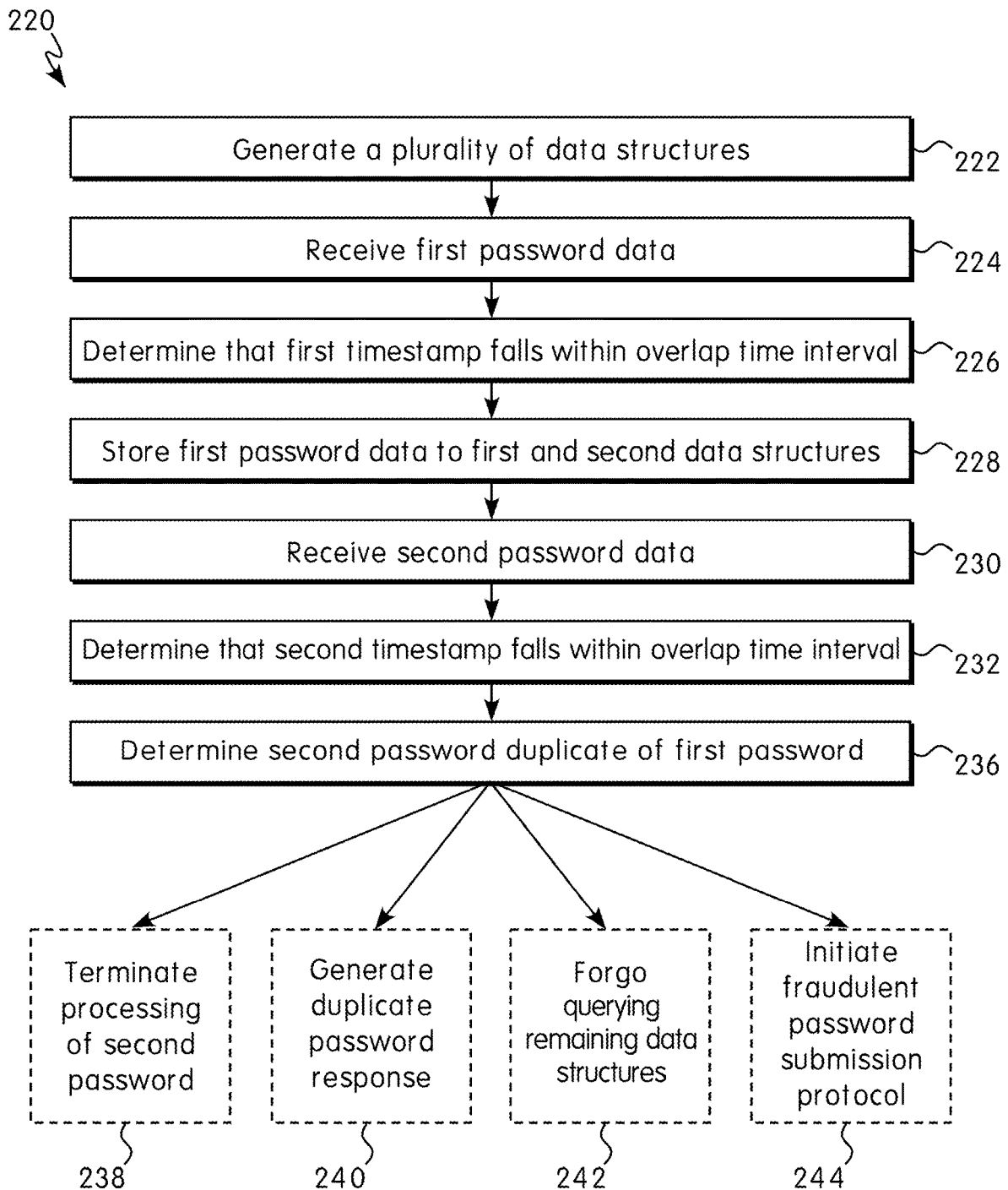
FIG. 11 shows a step diagram of a method for preventing duplicate processing of a password assigned for temporary use according to the present invention.

Referring to FIG. 11, a method 220 for preventing duplicate processing of a password assigned for temporary use is shown. At a first step 222, a processor generates a plurality of data structures 52 (including the first data structure 12 and the second data structure 14). The first data structure 12 and the second data structure 14 are as previously described and include the overlap region 36. The first step 222 is identical to the first step 102 from the method 100 described in FIG. 4 except the data in the method 220 is specifically associated with a password of a user account assigned for temporary use. A password assigned for temporary use may be the initial password associated with an account, which the user may use at the first login, and this temporary password may be replaced with a user chosen password. A password assigned for temporary use may be a password associated with a user account in response to a user forgetting their current password, which the user may use at the next login, and this temporary password may be replaced with a new user chosen password. This password may expire after a certain period of time, at which time a new temporary password may be required to login to the user account. For example, the temporary password may only be valid for several hours, days, weeks, or months. As used herein, "password" may refer to any sequence of number, letters, or symbols which may be entered to allow a user to access their password-secured account.

Figure 12:
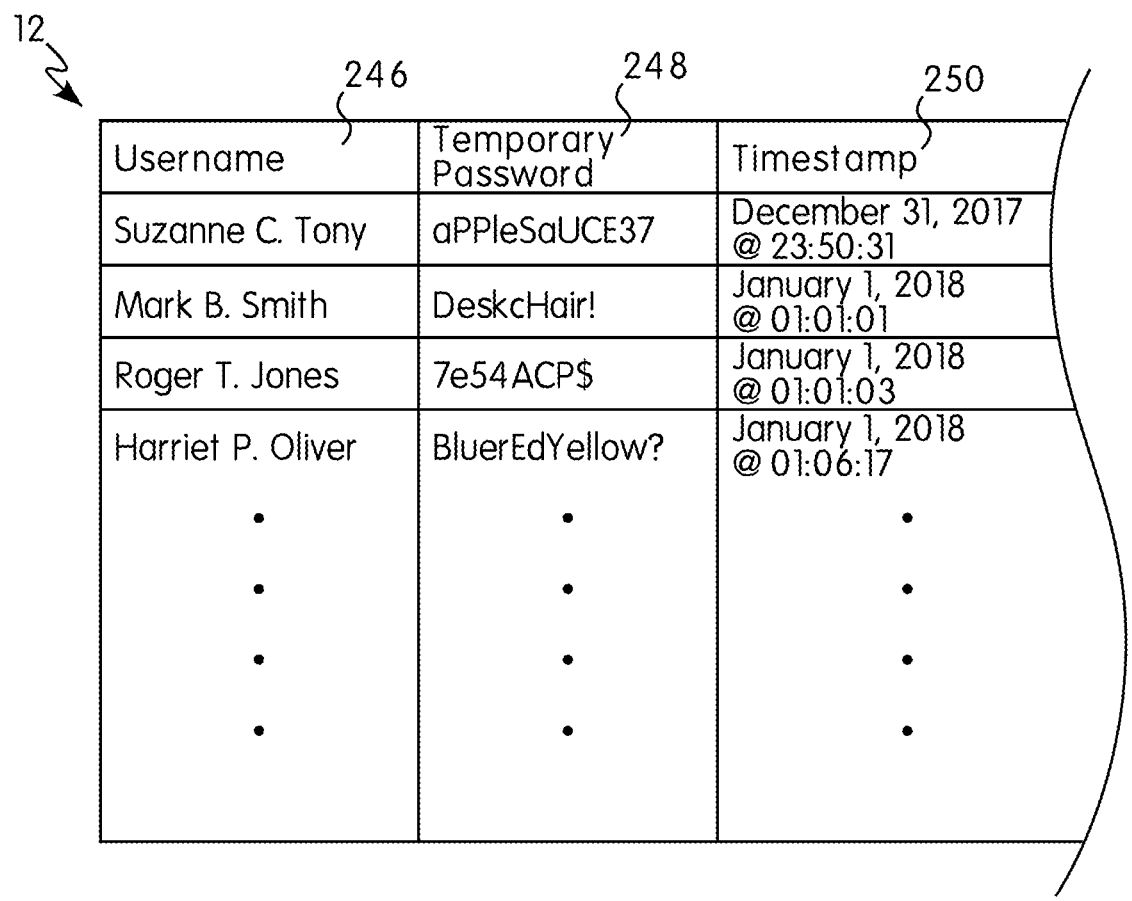
FIG. 12 shows a data structure for data associated with a password assigned for temporary use according to the present invention.

Referring to FIG. 12, the first data structure 12 (and all other data structures included therewith) is shown. The first data structure 12 may store the data associated with a temporary password issued in connection with a user account (password data). The password data may include a username 246 associated with the user account, a temporary password 248, and a timestamp 250. The temporary password 248 may be a unique password that allows a user to access the user account when entered into a login screen. The timestamp 150 may associate the temporary password with a specific time, such as the time the temporary password was issued. However, the timestamp 150 may be assigned based on other events occurring during processing of the password, such as an initial login time, the time of the request for issuance of a temporary password, the time the account associated with the temporary password was initiated, and the like. Other transaction data may be included in the data structure, such as user information (e.g., name, contact information, demographics, etc.) or an account identifier associated with the user account.

Referring back to FIG. 1 the predetermined time intervals ($T_1$, $T_2$, and T3) may be the same or different in length and may be of any length appropriate for storage of password data. In one example, the predetermined time intervals may include at least one month, such as at least two months, one quarter, six months, or twelve months. In one example, the predetermine time interval is approximately one month, and all temporary passwords issued during a calendar month (plus the overlap region 36) are associated with the predetermined time interval. The overlap regions 36 may be the same or different and may be any overlap length appropriate for capturing password data that may be been delayed in its issuance and/or storage due to computer system malfunction. The overlap region 36 may be shorter than the predetermined time intervals. The overlap region may range from 1 minute in length to 1 day in length, such as 1 hour.

Referring back to FIG. 11, the method 220 may further include a second step 224 of receiving first password data. A processor may determine whether the first password associated with the first password data is an expired password. Receiving first password data may refer to a login attempt (a password processing request message) in which a user enters in a temporary password, such that the temporary password can be associated with the corresponding username and/or timestamp. The first password data may include any of the previously described password data, such as a first username, a first temporary password, and/or a first timestamp. At a third step 226, a processor determines based on the first timestamp that the first password data falls within the overlap region 36. This may be performed by determining whether the first timestamp is associated with a time defined within the overlap region 36. At a fourth step 228, a processor, upon determining that the first password data falls within the overlap region 36, may store the first password data to the first data structure 12 and the second data structure 14 (because the overlap region 36 is associated with both the first data structure 12 and the second data structure 14). If the first password data is a duplicate of password data previously stored, it may not be subsequently stored (because it is a duplicate). However, if the first password data is not a duplicate, it may be processed prior to, during, or after the first password data has been stored by allowing the user access to the account upon entering the temporary password.

With continued reference to FIG. 11, at a fifth step 230, a processor receives second password data including a second username, a second timestamp and/or a second temporary password. A processor may determine whether the second temporary password associated with the second password data is an expired password. The second password data may be the same or different from the first password data (e.g., duplicate data or different data).

With continued reference to FIG. 11, at a sixth step 232, a processor may determine that the second password data falls within the overlap time interval. At a seventh step 236, a processor may determine that the first password data and the second password data are duplicates of one another. This may be at least partially based on the second password ID matching the stored (in the data structure) first password ID. The password IDs of two data entries may indicate that the request to process the password data is a duplicate and that the system has already processed that particular password data.

Determining that the first password data and the second password data are duplicates of one another may be determined by the first data structure 12 and/or the second data structure 14. This may include the request processor 44 communicating to the first data structure 12 and/or the second data structure 14 to write the second password data to the data structure and the first and/or second data structure 12, 14 determining that the second password data is duplicate to the first password data. The first and/or second data structure 12, 14 in this case may communicate to the request processor 44 that the second password data has not been stored because it is a duplicate password. For example, the first and/or second data structure 12, 14 may return a value indicating that the entry is duplicative. As an example, in response to an operation to insert the second password data into the first data structure and/or the second data structure 12, 14, the data structure(s) may return a value indicating that the second password data is a duplicate. The return may be provided by the programmatic functionality of the data structure(s) itself, and may be binary to indicate whether the insertion operation succeeded or failed. A failed return in such an example indicates that there is a duplicate.

In some examples, determining that the first password data and the second password data are duplicates of one another may be determined by the request processor 44 querying the first and/or the second data structures 12, 14 associated with the overlap time interval. In some examples, the request processor 44 may query only the relevant data structure that includes password data temporally later than the latest password data in the temporally preceding data structure having the overlap time interval.

Upon determining that the second password data is a duplicate of the first password data, the request processor 44 may initiate a suitable response, as follows.

With continued reference to FIG. 11, at a step 8a 238, the request processor 44 may terminate processing of the second password entry (e.g., deny entry of access to a user account upon the second use of the temporary password). At a step 8b 240, the request processor 44 may generate and communicate a duplicate password response message to the requesting device 42. The duplicate password response message may include data that identifies the second password data as identical to the first password data. The duplicate password response message may indicate that the second password data was not processed because it was previously processed as the first password data.

At a step 8c 242, upon determining that the second password data is duplicate of the first password data, the system may forgo querying remaining data structures (data structures other than first data structure 12 and/or the second data structure). Since the first data structure 12 and/or the second data structure was queried, the remaining data structures are not be queried because the system of the present invention ensures that the password data would have been stored in the first data structure 12 and/or the second data structure. This feature reduces overall querying time and efficiency of the computer system.

At a step 8d 244 the request processor 44 may initiate a fraudulent password submission protocol. This protocol may initiate at least one step that allows the submission of the second password data to be reviewed for potential fraud. This may include transmitting a message to the issuer of the user account that notifies of this potential fraud. The request processor 44 may also notify the user of potential fraud by communicating with the user, such as by email, phone call, text message, or other communication means. The request processor 44 may temporally halt any further access of user to the user account until the potential fraud is investigated.

Each of these potential steps 238-244 initiated by the request processor 44 may enhance the overall efficiency of the computer system and the security associated with each cardholder account.

Referring to FIG. 13A, a login screen for processing of a password assigned for temporary use, the system processing a first request for processing the password, is shown. The login screen may include a user interface and fields into which the user enters password data. The user may enter the temporary password into a freeform field. The user may also enter a username associated with the temporary password into a freeform field. There may be other freeform fields or other fields that a user may fill in to login to the user account. Upon entering the temporary password, the timestamp and other of the first password data associated therewith may be retrieved by the system. The request processor 44 may use this first password data to execute the method 220 described in FIG. 11 and determine that the first password data is not duplicate data and has not been used to access the user account. The user may then be allowed access to the user account based on entering the correct temporary password. The user interface may indicate that the login attempt using the temporary password was successful.

Referring to FIG. 13B, a login screen for preventing duplicate processing of a password assigned for temporary use, the system processing a second duplicate request for processing the password, is shown. The second password data (and second temporary password thereof) is identical to the first password data (and first temporary password thereof). The request processor may use this second password data to execute the method 220 described in FIG. 11 and determine that the second password data is a duplicate of the first password data. The user may be denied access to the user account based on entering the temporary password which has already been used as the first temporary password. The user interface may indicate that the login attempt using the temporary password failed. Thus, the system may allow access to a user account upon entering the correct temporary password a first time, but may deny access upon the temporary password being used a second time, whether it be re-entered in error by the user or fraudulently by a potential identity thief.

A computer program product is also contemplated for preventing duplicate processing of a password assigned for temporary use, the computer program product including at least one non-transitory computer-readable medium including program instructions that, when executed by at least one computer including at least one processor, causes the at least one processor to effect the method steps as outlined in FIG. 11 and described above.

Processing of Temporary Offers

Non-limiting embodiments or aspects of the present invention are directed to a method, system and computer program product for preventing duplicate processing of an offer issued for temporary use. The advantages of this non-limiting embodiment or aspect include the previously-described advantages of the method, system, and computer program product for preventing duplication of data processing. The present invention ensures that duplicate offer processing request messages are identified such that offers that have already been redeemed are not re-processed. This allows the system to be less error prone such that the computer system (or other computer systems) are not later required to correct mistakes associated with processing on offer multiple times (such as transfer money back to the original accounts). The present invention also allows for detection of potentially fraudulent offer processing request messages that are communicating a duplicate offer transaction to the computer system for processing in order to obtain funds or goods/services at a lower rate. Upon detection of potentially fraudulent activity, protocols can be initiated to prevent the fraudulent activity or detect its source.

Figure 14:
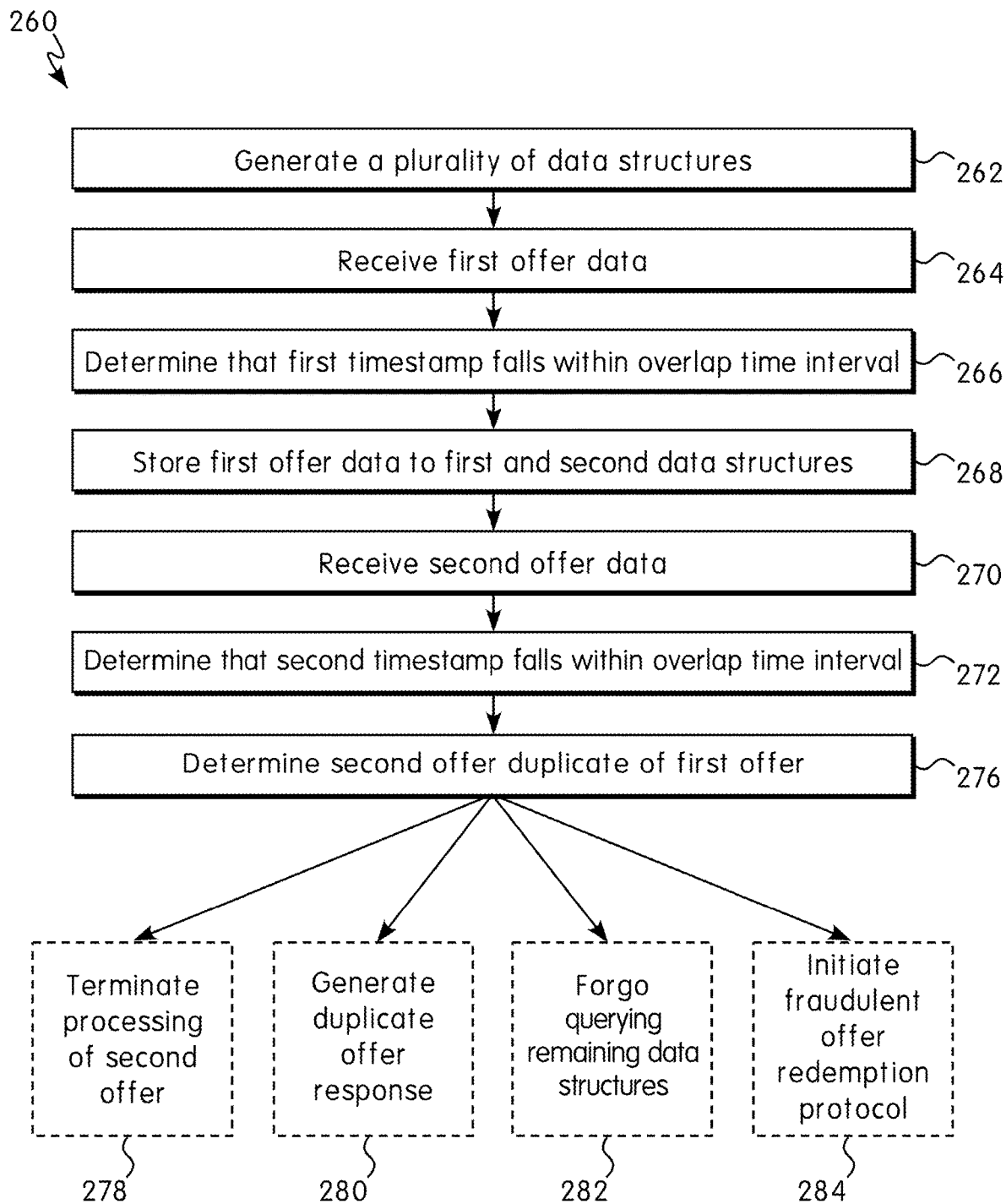
FIG. 14 shows a step diagram of a method for preventing duplicate processing of an offer issued for temporary use according to the present invention.

Referring to FIG. 14, a method 260 for preventing duplicate processing of an offer issued for temporary redemption is shown. At a first step 262, a processor generates a plurality of data structures 52 (including the first data structure 12 and the second data structure 14). The first data structure 12 and the second data structure 14 are as previously described and include the overlap region 36. The first step 262 is identical to the first step 102 from the method 100 described in FIG. 4 except the data in the method 260 is specifically associated with an offer issued for temporary use, redeemable during a payment transaction initiated using a portable financial device. An offer issued for temporary use may be an offer associated with a user or a plurality of users which, once redeemed, bestows a benefit upon the redeeming user. The benefit may be a discount, a free product, or any other type of benefit known in the art. The offer may expire after a certain period of time. For example the offer may only be valid for several hours, days, weeks, or months.

Referring to FIG. 15, the first data structure 12 (and all other data structures included therewith) is shown. The first data structure 12 may store the data associated with temporary offers (offer data). The offer data may include a PAN number 146 (or other account identifier), a temporary offer ID 286, an offer description 288, and/or a timestamp 290. The temporary offer ID 286 may be a unique identifier that allows the offer to be identified solely based on that temporary offer ID 286. The temporary offer ID 286 may take any form, as previously discussed in connection with the first data ID. The timestamp 290 may associate the temporary offer with a specific time, such as the time the temporary offer was initiated and issued. However, the timestamp 290 may be assigned based on other events occurring during processing of the offer, such as when the temporary offer was received by a certain party/system (e.g., merchant, transaction service provider, issuer, user, and the like), and the like. Other offer data may be included in the data structure, such as: cardholder information of the portable financial device used to initiate the payment transaction during which the offer was redeemed (e.g., name, contact information, demographics, etc.), merchant information (e.g., merchant name, merchant ID, merchant bank identification number (BIN), etc.), information about the goods/services purchased during the transaction in which the offer was redeemed (e.g., type of goods, quantity of goods, price of goods, UPC code, etc.), information about the portable financial device during the transaction in which the offer was redeemed (e.g., expiration data, cvv code, spend limit, etc.), and other information that may be included for processing offers redeemed during a payment transaction using a portable financial device (e.g., ISO defined data elements according to ISO 8583).

Referring back to FIG. 1 the predetermined time intervals ($T_1$, $T_2$, and T3) may be the same or different in length and may be of any length appropriate for storage of offer data. In one example, the predetermined time intervals may include at least one month, such as at least two months, one quarter, six months, or twelve months. In one example, the predetermine time interval is approximately one month, and all offers issued during a calendar month (plus the overlap region 36) are associated with the predetermined time interval. The overlap regions 36 may be the same or different and may be any overlap length appropriate for capturing issued offers that may be been delayed in their initiation and/or storage due to computer system malfunction. The overlap region 36 may be shorter than the predetermined time intervals. The overlap region may range from 1 minute in length to 1 day in length, such as 1 hour.

Referring back to FIG. 14, the method 260 may further include a second step 264 of receiving first offer data. A processor may determine whether the first offer associated with the first offer data is an expired offer. The first offer data may include any of the previously described offer data, such as a first PAN number, a temporary offer ID, an offer description and/or a first timestamp. At a third step 266, a processor determines based on the first timestamp that the first offer data falls within the overlap region 36. This may be performed by determining whether the first timestamp is associated with a time defined within the overlap region 36. At a fourth step 268, a processor, upon determining that the first offer data falls within the overlap region 36, may store the first offer data to the first data structure 12 and the second data structure 14 (because the overlap region 36 is associated with both the first data structure 12 and the second data structure 14). If the first offer data is a duplicate of transaction data previously stored, it may not be subsequently stored (because it is a duplicate). However, if the first offer data is not a duplicate, it may be processed prior to, during, or after the first offer data has been stored, such as application of the benefit of the offer to the payment transaction with which the offer is redeemed.

With continued reference to FIG. 14, at a fifth step 270, a processor receives second offer data including a second PAN number, a second timestamp, a second offer description, and/or a second offer ID. A processor may determine whether the second offer associated with the second offer data is an expired offer. The second offer data may be the same or different from the first offer data (e.g., duplicate data or different data). The second offer data may be received from the same or a different source (e.g., requesting device 42) as the first offer data. For example, the first offer data and the second offer data may be received by the request processor 44 from a merchant system along with a payment transaction processing request, with the second offer data being received based on the merchant system malfunctioning and inadvertently re-submitting the first offer data as second offer data. In another non-limiting example, the first offer data may be received from the merchant system, and the second offer data may be received by a separate fraudulent system intending to receive funds or a discount by the request processor 44 not determining that the first offer data and second offer data are identical and again applying the second offer data.

With continued reference to FIG. 14, at a sixth step 272, a processor may determine that the second offer data falls within the overlap time interval. At a seventh step 276, a processor may determine that the first offer data and the second offer data are duplicates of one another. This may be at least partially based on the second offer ID matching the stored (in the data structure) first offer ID. The offer IDs of two data entries may indicate that the request to process the offer data is a duplicate and that the system has already processed that particular offer data.

Determining that the first offer data and the second offer data are duplicates of one another may be determined by the first data structure 12 and/or the second data structure 14. This may include the request processor 44 communicating to the first data structure 12 and/or the second data structure 14 to write the second offer data to the data structure and the first and/or second data structure 12, 14 determining that the second offer data is duplicate to the first offer data. The first and/or second data structure 12, 14 in this case may communicate to the request processor 44 that the second offer data has not been stored because it is a duplicate offer. For example, the first and/or second data structure 12, 14 may return a value indicating that the entry is duplicative. As an example, in response to an operation to insert the second offer data into the first data structure and/or the second data structure 12, 14, the data structure(s) may return a value indicating that the second offer data is a duplicate. The return may be provided by the programmatic functionality of the data structure(s) itself, and may be binary to indicate whether the insertion operation succeeded or failed. A failed return in such an example indicates that there is a duplicate.

In some examples, determining that the first offer data and the second offer data are duplicates of one another may be determined by the request processor 44 querying the first and/or the second data structures 12, 14 associated with the overlap time interval. In some examples, the request processor 44 may query only the relevant data structure that includes offer data temporally later than the latest offer data in the temporally preceding data structure having the overlap time interval.

Upon determining that the second offer data is a duplicate of the first offer data, the request processor 44 may initiate a suitable response, as follows.

With continued reference to FIG. 14, at a step 8a 278, the request processor may 44 terminate processing of the second offer data, such that the benefit from the second offer is not redeemed a second time. At a step 8b 280, the request processor 44 may generate and communicate a duplicate offer response message to the requesting device 42. The duplicate offer response message may include data that identifies the second offer data as identical to the first offer data. The duplicate offer response message may indicate that the second offer data was not processed because it was previously processed as the first offer data. The duplicate offer response message may be identical to the offer response message sent to the requesting device 42 after processing the first offer data.

At a step 8c 282, upon determining that the second offer data is duplicate of the first offer data, the system may forgo querying remaining data structures (data structures other than first data structure 12 and/or the second data structure). Since the first data structure 12 and/or the second data structure was queried, the remaining data structures are not be queried because the system of the present invention ensures that the offer data would have been stored in the first data structure 12 and/or the second data structure. This feature reduces overall querying time and efficiency of the computer system.

At a step 8d 284 the request processor 44 may initiate a fraudulent offer redemption protocol. This protocol may initiate at least one step that allows the submission of the second offer data to be reviewed for potential fraud. This may include transmitting a message to the transaction service provider and/or the issuer of the temporary offer associated with the second offer data that notifies of this potential fraud.

Each of these potential steps 278-284 initiated by the request processor 44 may enhance the overall efficiency of the computer system and ensure that an offer is not redeemed multiple times.

Figure 16A:
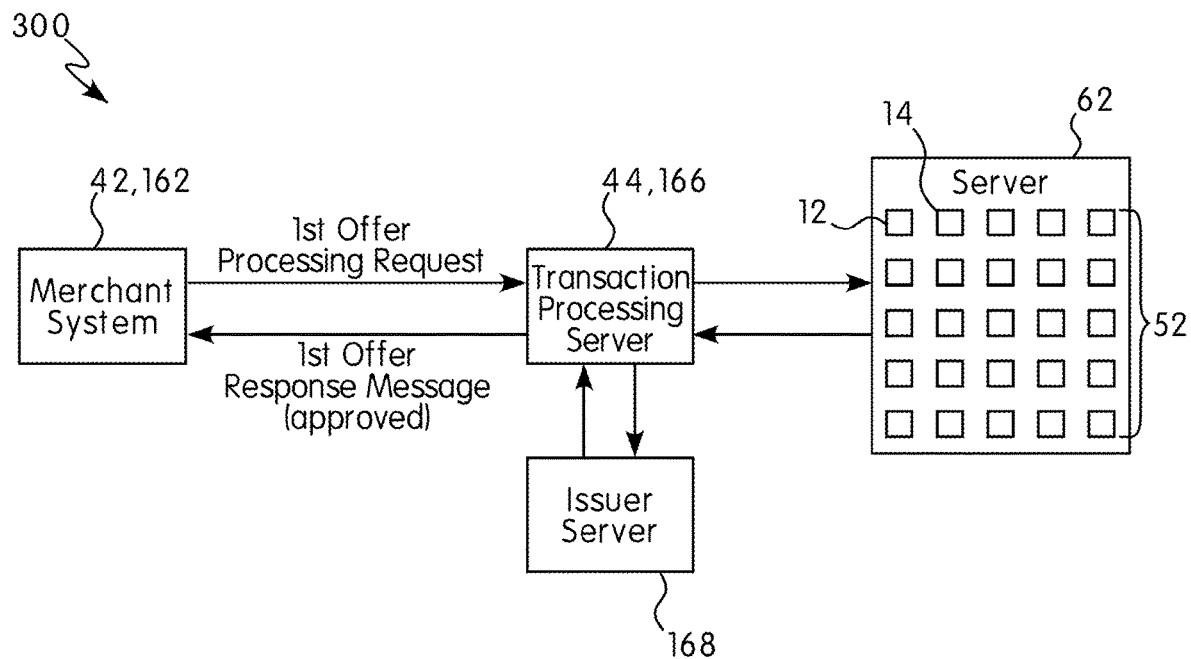
FIG. 16A shows a schematic diagram of a system for preventing duplicate processing of an offer issued for temporary use, the system processing a first request for processing the offer according to the present invention.

Referring to FIG. 16A, the system 300 is identical to the system 160 from FIG. 7A except in the following ways. The merchant system 162 in FIG. 10A may communicate a first offer processing request including a request to processes a first offer including first offer data to the transaction processing server 166. The transaction processing server 166 may execute the method 260 described in FIG. 14 and determine that the first offer data is not duplicate data and has not been redeemed. The transaction processing server 166 may then communicate with the issuer server 168 to process the first offer (e.g., apply the benefit of the offer to the payment transaction). The issuer server 168 may determine whether the payment transaction during which the offer was redeemed and submit its authorization decision to the transaction processing server 166. The transaction processing server 166 may communicate a first offer response message to the merchant system 162 which communicates that the payment transaction has been approved and redemption of the offer has been approved (redeemed and applied).

Figure 16B:
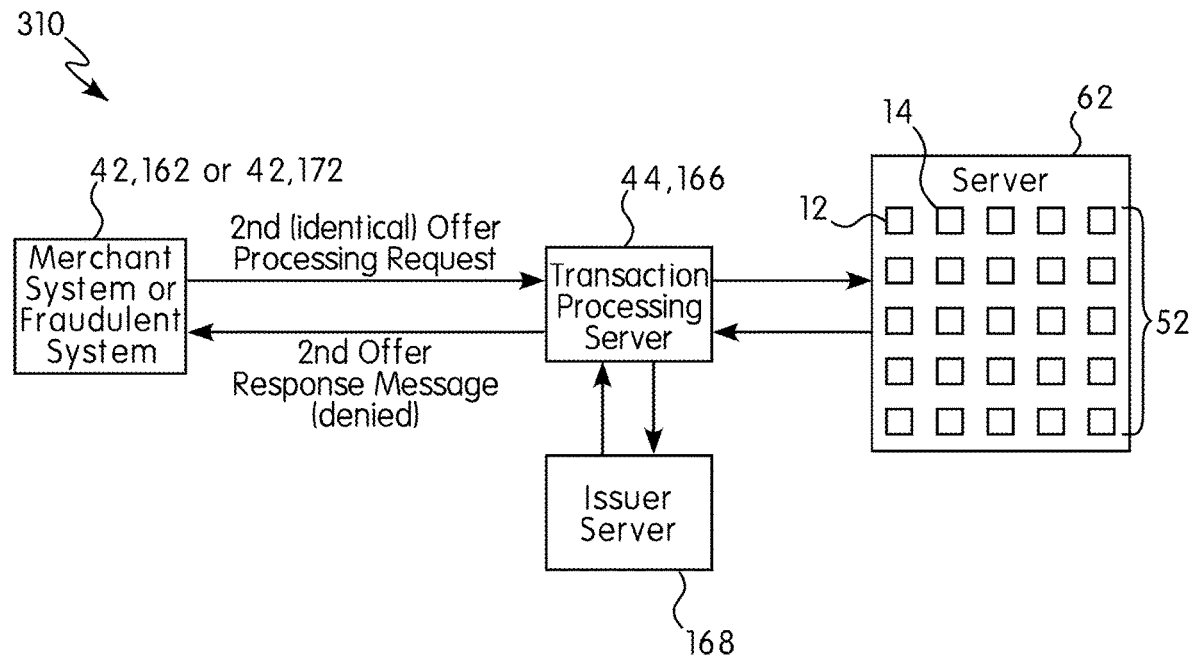
FIG. 16B shows a schematic diagram of a system for preventing duplicate processing of an offer assigned for temporary use, the system processing a second duplicate request for processing the offer according to the present invention.

Referring to FIG. 16B, the system 310 is identical to the system 170 from FIG. 7B except in the following ways. The merchant system 162 or fraudulent system 172 may communicate a second offer processing request including a request to process a second offer including second offer data to the transaction processing server 166. The second offer (and second offer data thereof) and first offer (and first offer data thereof) are identical in this example. The transaction processing server 166 may execute the method 260 described in FIG. 14 and determine that the second offer data is a duplicate of the first offer data. The transaction processing server 166 may then communicate a second offer response message to the merchant system 162 or fraudulent system 172 to communicate that the request to process the second offer transaction is denied and may indicate that the second offer data is a duplicate of the first offer data, which was already redeemed.

A computer program product is also contemplated for preventing duplicate processing of an offer assigned for temporary use, the computer program product including at least one non-transitory computer-readable medium including program instructions that, when executed by at least one computer including at least one processor, causes the at least one processor to effect the method steps as outlined in FIG. 14, and system in FIGS. 16A-16B, and as described above.

EXAMPLE

The following example is provided to illustrate an embodiment of the system, method, and computer program product for preventing duplication of data processing. In this particular example, the data is associated with a payment transaction; however, it will be appreciated that other examples in which the data is of a different kind are also considered (e.g., token data, password data, offer data, and the like).

Figure 17:
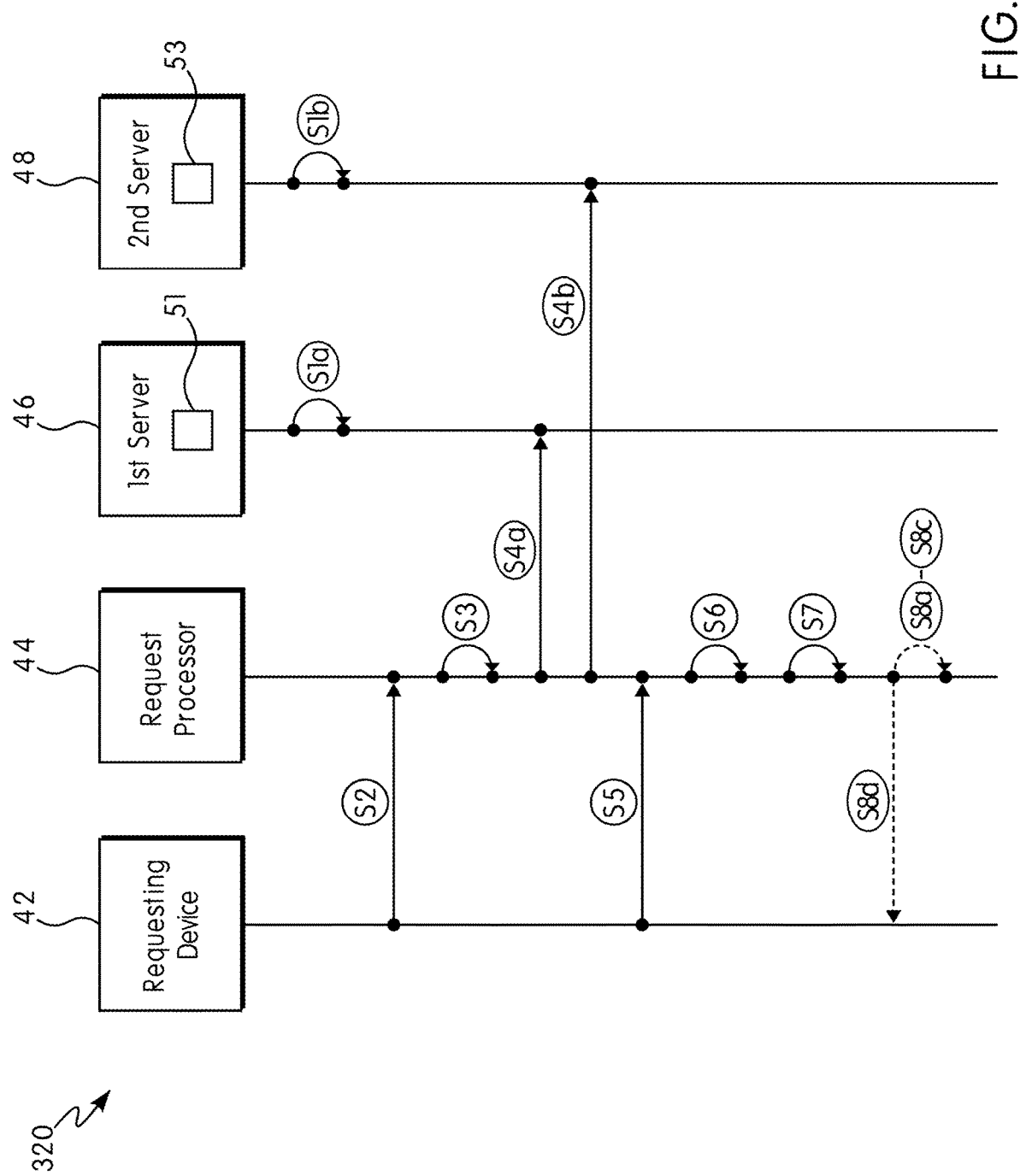
FIG. 17 shows a process flow diagram of a method for preventing duplicate processing of data according to the present invention.

Referring to back to FIGS. 2, 4, 5-7 and referring to FIG. 17, a method 320 for preventing duplicate processing of a payment transaction is shown. In this Example, Walter Smith is a consumer shopping at Big Box Mart, and Walter purchases a new laptop computer from Big Box Mart. At the point-of-sale, Walter presents his portable financial device (credit card) to the casher to initiate the payment transaction. Big Box Mart's merchant system (a POS device and a requesting device 42) collects Walter's credit card information, as well as other relevant transaction data for completing the payment transaction. The payment transaction was initiated on Jan. 31, 2018 at 11:47:23 PM EST. The transaction service provider associated with Walter's credit card is First CC Company, and the issuer of Walter's Credit Card is First Bank.

At a first step (S1a-S1b), a plurality of data structures are generated. A first data structure 51 is generated and is stored on a first server 46, and a separate second data structure 53 is stored on a separate second server 48. The first server 46 and the second server 48 are operated by or on behalf of First CC Company and/or First Bank. In this example, the first server 46 and the second server 48 are operated by or on behalf of First CC Company.

The first data structure 51 and the second data structure 52 store transaction data associated with payment transactions initiated using a portable financial device. The first data structure 51 is defined by a first start time of Dec. 31, 2017 at 10:00:00 PM EST and first end time of Jan. 31, 2018 at 11:59:59 PM EST ($T_1$). The second data structure 53 is defined by a second start time of Jan. 31, 2018 at 10:00:00 PM EST and a second end time of Feb. 28, 2018 at 11:59:59 PM EST ($T_2$). The first data structure 31 and second data structure include an overlap region 36 that overlap with one another (overlap time interval) (Jan. 31, 2018 at 10:00:00 PM EST to Jan. 31, 2018 at 11:59:59 PM).

At a second step (S2), Big Box Mart's requesting device 42 communicates first transaction data including the transaction data collected from Walter associated with the payment transaction for the laptop computer. The first transaction data includes the PAN number associated with Walter's credit card, an assigned unique first transaction ID, and a first time stamp associated with initiation of the payment transaction. The requesting device 42 communicates the first transaction data to a processor operated by or on behalf of First CC Company (a request processor 44). The requesting device 42 and/or the request processor 44 associate the first timestamp associated with initiation of the first payment transaction and the unique first transaction ID with the payment transaction between Walter and Big Box Mart.

At a third step (S3), the request processor 44 determines whether the payment transaction falls within the overlap region 36 based on the first timestamp. Since the transaction was initiated on Jan. 31, 2018 at 11:47:23 PM EST, it falls within the overlap region 36. At a fourth step (S4a-S4b), the request processor 44 stores the first transaction data of the payment transaction to the first data structure 51 and the second data structure 53. Since this payment transaction has not been processed (the transaction data was not previously stored to the first data structure 51 and the second data structure 53), the payment transaction is then processed to completion (authorized, cleared, settled).

At some time later, a fraudulent system operated by or on behalf of an identity thief effects a scheme in which the fraudulent system (now the requesting device 42 for the remaining steps of the process 320) communicates transaction data to the request processor 44 and collects funds from the payment transaction being re-processed.

In this example, the fraudulent system obtains the transaction data associated with Walter's payment transaction with Big Box Mart for the laptop computer. This transaction data (referred to hereinafter as second transaction data) is identical (at least in part) to the first transaction data.

At a fifth step (S5), the request processor 44 receives the second transaction data from the fraudulent system. The second transaction data has a second timestamp and a second transaction ID identical to the first timestamp and the first transaction ID.

At a sixth step (S6), the request processor determines whether the second transaction data falls within the overlap region 36. Since the transaction was initiated on Jan. 31, 2018 at 11:47:23 PM EST, it falls within the overlap region 36. At an seventh step (S7), the request processor 44 determines that the second transaction data is a duplicate of the first transaction data (that Walter's payment transaction has already been processed). This determination may be made based on the identical first and second transaction ID.

At a eighth step (S8a-S8d), the request processor 44 may initiate an action in response to determining that the second transaction data is a duplicate of the first transaction data. The request processor 44 may terminate processing of the second transaction data (S8a), such that the payment transaction is not re-processed. The request processor 44 may forgo querying remaining data structures (S8b). The request processor 44 may initiate a fraudulent transaction submission protocol (S8c) to determine the identity of the fraudulent system and/or protect Walter's credit card account or Big Box Mart. This may include communicating with a device associated with Walter and/or Big Box Mart to notify of the potential fraud. The request processor 44 may communicate (S8d) a duplicate transaction data response to the fraudulent system to identifying the payment transaction as having already been processed or by returning an identical response compared to the response sent to Big Box Mart's merchant system upon the first transaction data being processed to the fraudulent system.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A method for preventing duplicate processing of temporary tokens, comprising:

determining, with at least one processor, a first start time and a first end time for a first predetermined time interval;

generating, with at least one processor, a first data structure associated with a first unique identifier and based on the first predetermined time interval;

determining, with at least one processor, a second start time and a second end time for a second predetermined time interval, wherein the second start time is later than the first start time and earlier than the first end time, and wherein the second end time is later than the first end time;

generating, with at least one processor, a second data structure associated with a second unique identifier and based on the second predetermined time interval;

determining, with at least one processor, an overlap time interval between the second start time and the first end time, the overlap time interval comprising a first interval portion corresponding to a first overlap region of the first data structure and a second interval portion corresponding to a second overlap region of the second data structure;

receiving a plurality of temporary tokens, each temporary token of the plurality of temporary tokens comprising a token ID and a timestamp representing a generation time of the temporary token;

determining, with at least one processor, for each temporary token of the plurality of temporary tokens, whether to store token data associated with each token in the first data structure, the second data structure, or both the first data structure and the second data structure based on the timestamp of the temporary token;

determining, with at least one processor, that at least one temporary token of the plurality of temporary tokens is a duplicate token based on token data for at least two temporary tokens stored in the first overlap region of the first data structure and the second overlap region of the second data structure; and upon determining that the at least one temporary token is a duplicate token, terminating, with at least one processor, processing of the duplicate token.

2. The method of claim 1, further comprising: upon determining that the at least one temporary token is a duplicate token, generating and communicating, with at least one processor, a duplicate token response.

3. The method of claim 2, wherein the duplicate token response is identical to a response message communicated in connection with processing of at least one other temporary token.

4. The method of claim 1, wherein the first data structure and the second data structure are stored by separate servers.

5. The method of claim 1, wherein determining that the at least one temporary token is a duplicate token comprises receiving a return value in response to a request to store the token data for the at least one temporary token.

6. The method of claim 1, further comprising: upon determining that the at least one temporary token is a duplicate token, automatically initiating a fraudulent token submission protocol.

7. The method of claim 1, wherein the first predetermined time interval and/or the second predetermined time interval comprises at least one month.

8. The method of claim 1, wherein the overlap time interval comprises an interval between one minute and one day.

9. The method of claim 1, wherein the token data is received in a form of a token processing request message.

10. A system for preventing duplicate processing of temporary tokens, comprising at least one processor programmed or configured to:

determine a first start time and a first end time for a first predetermined time interval;

generate a first data structure associated with a first unique identifier and based on the first predetermined time interval;

determine a second start time and a second end time for a second predetermined time interval, wherein the second start time is later than the first start time and earlier than the first end time, and wherein the second end time is later than the first end time;

generate a second data structure associated with a second unique identifier and based on the second predetermined time interval;

determine an overlap time interval between the second start time and the first end time, the overlap time interval comprising a first interval portion corresponding to a first overlap region of the first data structure and a second interval portion corresponding to a second overlap region of the second data structure;

receive a plurality of temporary tokens, each temporary token of the plurality of temporary tokens comprising a token ID and a timestamp representing a generation time of the temporary token;

determine, for each temporary token of the plurality of temporary tokens, whether to store token data associated with each token in the first data structure, the second data structure, or both the first data structure and the second data structure based on the timestamp of the temporary token;

determine that at least one temporary token of the plurality of temporary tokens is a duplicate token based on token data for at least two temporary tokens stored in the first overlap region of the first data structure and the second overlap region of the second data structure; and upon determining that the at least one temporary token is a duplicate token terminate processing of the duplicate token.

11. The method of claim 10, wherein the at least one processor is further configured to: upon determining that the at least one temporary token is a duplicate token, generate and communicate a duplicate token response.

12. The method of claim 11, wherein the duplicate token response is identical to a response message communicated in connection with processing of at least one other temporary token.

13. The system of claim 10, wherein the first data structure and the second data structure are stored by separate servers.

14. The system of claim 10, wherein determining that the at least one temporary token is a duplicate token comprises receiving a return value in response to a request to store the token data for the at least one temporary token.

15. The system of claim 10, wherein the at least one processor is further configured to: upon determining that the at least one temporary token is a duplicate token, automatically initiate a fraudulent token submission protocol.

16. The system of claim 10, wherein the first predetermined time interval and/or the second predetermined time interval comprises at least one month.

17. The system of claim 10, wherein the overlap time interval comprises an interval between one minute and one day.

18. The system of claim 10, wherein the token data is received in a form of a token processing request message.

19. A computer program product for preventing duplicate processing of temporary tokens, comprising at least one non-transitory computer-readable medium including program instructions that, when executed by at least one processor, cause the at least one processor to:
- determine a first start time and a first end time for a first predetermined time interval;
- generate a first data structure associated with a first unique identifier and based on the first predetermined time interval;
- determine a second start time and a second end time for a second predetermined time interval, wherein the second start time is later than the first start time and earlier than the first end time, and wherein the second end time is later than the first end time;
- generate a second data structure associated with a second unique identifier and based on the second predetermined time interval;
- determine an overlap time interval between the second start time and the first end time, the overlap time interval comprising a first interval portion corresponding to a first overlap region of the first data structure and a second interval portion corresponding to a second overlap region of the second data structure;
- receive a plurality of temporary tokens, each temporary token of the plurality of temporary tokens comprising a token ID and a timestamp representing a generation time of the temporary token;
- determine, for each temporary token of the plurality of temporary tokens, whether to store token data associated with each token in the first data structure, the second data structure, or both the first data structure and the second data structure based on the timestamp of the temporary token;
- determine that at least one temporary token of the plurality of temporary tokens is a duplicate token based on token data for at least two temporary tokens stored in the first overlap region of the first data structure and the second overlap region of the second data structure; and
- upon determining that the at least one temporary token is a duplicate token, terminate processing of the duplicate token.

20. The computer program product of claim 19, wherein the program instructions further cause the at least one processor to: upon determining that the at least one temporary token is a duplicate token, automatically initiate a fraudulent token submission protocol.

* * * * *

UNITED STATES PATENT AND TRADEMARK OFFICE
CERTIFICATE OF CORRECTION

PATENT NO. : 11,580,552 B2
APPLICATION NO. : 17/323304
DATED : February 14, 2023
INVENTOR(S) : Jie Zhang It is certified that error appears in the above-identified patent and that said Letters Patent is hereby corrected as shown below:

In the Claims

Column 46, Line 46, Claim 11, delete "method" and insert -- system --

Column 46, Line 50, Claim 12, delete "method" and insert -- system --

Signed and Sealed this
Fourth Day of April, 2023

Katherine Kelly Vidal
*Director of the United States Patent and Trademark Office*